United States Patent
Zilka et al.

(10) Patent No.: US 7,117,443 B1
(45) Date of Patent: *Oct. 3, 2006

(54) NETWORK BROWSER GRAPHICAL USER INTERFACE FOR MANAGING WEB CONTENT

(76) Inventors: Kevin J. Zilka, 144 S. 3rd St., #138, San Jose, CA (US) 95112; Dominic M. Kotab, 144 S. 3rd St., #123, San Jose, CA (US) 95112

( * ) Notice: Subject to any disclaimer, the term of this patent is extended or adjusted under 35 U.S.C. 154(b) by 181 days.

This patent is subject to a terminal disclaimer.

(21) Appl. No.: 10/691,057

(22) Filed: Oct. 22, 2003

Related U.S. Application Data

(63) Continuation of application No. 10/671,045, filed on Sep. 24, 2003, which is a continuation-in-part of application No. 10/324,887, filed on Dec. 18, 2002, which is a continuation-in-part of application No. 10/254,410, filed on Sep. 24, 2002.

(60) Provisional application No. 60/324,941, filed on Sep. 24, 2001.

(51) Int. Cl.
*G06F 17/00* (2006.01)

(52) U.S. Cl. ...................................... 715/739
(58) Field of Classification Search ................ 715/738, 715/739, 740, 760, 855
See application file for complete search history.

(56) References Cited

U.S. PATENT DOCUMENTS

| | | | | |
|---|---|---|---|---|
| 5,159,334 A | 10/1992 | Baumert et al. | ........ | 340/825.72 |
| 5,737,560 A | 4/1998 | Yohanan | ..................... | 395/349 |
| 5,778,256 A | 7/1998 | Darbee | ........................ | 395/892 |
| 5,877,765 A | 3/1999 | Dickman et al. | ........... | 345/349 |
| 5,877,767 A | 3/1999 | Yohanan | ..................... | 345/357 |
| 5,895,465 A | 4/1999 | Guha | ............................ | 707/4 |
| 5,918,237 A | 6/1999 | Montalbano | ................. | 707/513 |
| 5,950,214 A | 9/1999 | Rivette et al. | .............. | 707/512 |
| 5,978,817 A | 11/1999 | Giannandrea et al. | ...... | 707/501 |
| 5,991,751 A | 11/1999 | Rivette et al. | ................. | 707/1 |
| 5,991,780 A | 11/1999 | Rivette et al. | .............. | 707/512 |
| 5,999,907 A | 12/1999 | Donner | .......................... | 705/1 |
| 6,012,093 A * | 1/2000 | Maddalozzo et al. | ........ | 709/223 |
| 6,014,663 A | 1/2000 | Rivette et al. | .................. | 707/4 |
| 6,018,714 A | 1/2000 | Risen, Jr. et al. | ................ | 705/4 |
| 6,018,749 A | 1/2000 | Rivette et al. | .............. | 707/525 |
| 6,072,491 A | 6/2000 | Yohanan | ...................... | 345/349 |
| 6,100,890 A | 8/2000 | Bates et al. | .................. | 345/357 |
| 6,108,651 A | 8/2000 | Guha | ............................ | 707/4 |

(Continued)

FOREIGN PATENT DOCUMENTS

WO 98/55945 A1 12/1998

(Continued)

OTHER PUBLICATIONS

Microsoft Internet Explorer (v. 6; copyright 1995-2001).*

(Continued)

*Primary Examiner*—Kristine Kincaid
*Assistant Examiner*—Thanh Vu
(74) *Attorney, Agent, or Firm*—Zilka-Kotab, PC

(57) ABSTRACT

A network browser graphical user interface is provided for use in association with a network browser. Included is a network browser window associated with a network browser for displaying content associated with uniform resource locators (URLs) during network browsing. Also displayed is a plurality of identifiers adjacent to or separate from the window in which the content is displayed. In use, a user is allowed to pre-select at least one of the identifiers. Moreover, after the pre-selection, content associated with at least one URL displayed during use of the network browser is correlated with the pre-selected identifier.

40 Claims, 30 Drawing Sheets

U.S. PATENT DOCUMENTS

| | | | | |
|---|---|---|---|---|
| 6,154,725 | A | 11/2000 | Donner | 705/1 |
| 6,189,024 | B1 | 2/2001 | Bauersfeld et al. | 709/203 |
| 6,243,091 | B1* | 6/2001 | Berstis | 715/839 |
| 6,252,597 | B1 | 6/2001 | Lokuge | 345/353 |
| 6,263,314 | B1 | 7/2001 | Donner | 705/1 |
| 6,275,862 | B1 | 8/2001 | Sharma et al. | 709/245 |
| 6,339,767 | B1 | 1/2002 | Rivette et al. | 707/2 |
| 6,381,651 | B1 | 4/2002 | Nishio et al. | 709/245 |
| 6,389,434 | B1 | 5/2002 | Rivette et al. | 707/512 |
| 6,434,580 | B1 | 8/2002 | Takano et al. | 707/530 |
| 6,437,527 | B1 | 8/2002 | Rhodes et al. | 318/280 |
| 6,478,001 | B1 | 11/2002 | Burns et al. | 123/90.41 |
| 6,578,078 | B1 | 6/2003 | Smith et al. | 709/224 |
| 6,601,173 | B1 | 7/2003 | Mohler | 713/201 |
| 6,667,751 | B1* | 12/2003 | Wynn et al. | 715/833 |
| 2001/0047404 | A1* | 11/2001 | Suda | 709/223 |
| 2002/0007373 | A1 | 1/2002 | Blair et al. | 707/505 |
| 2002/0032659 | A1 | 3/2002 | Waters | 705/54 |
| 2002/0035799 | A1 | 3/2002 | Germeraad et al. | 705/9 |
| 2002/0042841 | A1 | 4/2002 | Nishio et al. | 709/245 |
| 2002/0059076 | A1 | 5/2002 | Grainger et al. | 705/1 |
| 2002/0077835 | A1 | 6/2002 | Hagelin | 705/1 |
| 2002/0082778 | A1 | 6/2002 | Barnett et al. | 702/1 |
| 2002/0093528 | A1 | 7/2002 | Grainger | 345/738 |
| 2002/0111953 | A1 | 8/2002 | Snyder | 707/101 |
| 2002/0147742 | A1 | 10/2002 | Schroeder | 707/501.1 |
| 2002/0184095 | A1* | 12/2002 | Scullard et al. | 705/14 |
| 2002/0196272 | A1 | 12/2002 | Ramos et al. | 345/738 |
| 2003/0016241 | A1 | 1/2003 | Burke | 345/733 |
| 2003/0036945 | A1 | 2/2003 | Del Vecchie et al. | 705/10 |
| 2003/0046307 | A1* | 3/2003 | Rivette et al. | 707/104.1 |
| 2003/0135820 | A1 | 7/2003 | Aasman | 715/500 |
| 2003/0172020 | A1 | 9/2003 | Davies et al. | 705/36 |
| 2004/0181427 | A1 | 9/2004 | Stobbs et al. | 705/1 |
| 2004/0205537 | A1 | 10/2004 | Graham et al. | 715/511 |

FOREIGN PATENT DOCUMENTS

| | | |
|---|---|---|
| WO | 2339374 | 1/2000 |
| WO | 00/11575 A1 | 3/2000 |
| WO | 01/54031 A2 | 7/2000 |
| WO | 00/52618 A2 | 9/2000 |
| WO | 00/52618 A3 | 9/2000 |
| WO | 00/60495 A2 | 10/2000 |
| WO | 00/60495 A3 | 10/2000 |
| WO | 00/60496 A2 | 10/2000 |
| WO | 02/086744 A1 | 10/2000 |
| WO | 00/75851 A1 | 12/2000 |
| WO | 01/34277 | 5/2001 |
| WO | 01/84423 A2 | 8/2001 |
| WO | 01/84424 A2 | 8/2001 |
| WO | 01/84425 A2 | 8/2001 |
| WO | 01/84426 A2 | 8/2001 |
| WO | 01/73657 A1 | 10/2001 |
| WO | 02/059147 A2 | 1/2002 |
| WO | WO 02/05150 | 1/2002 |
| WO | 03/044718 | 5/2003 |

OTHER PUBLICATIONS

New Internet Exploer 5.5 Technologies Designed to Support Rich, Interactive Web Application (Jul. 12, 2000).□□*

Internet Explorer 5.X Basics (Realease date for IE 5.5 Jul. 12, 2000).*

Internet basics (IE 5.5 p. 7; Release date for IE 5.5 Jul. 12, 2000).*

U.S. Appl. No. 10/695,258, filed Oct. 28, 2003.

U.S. Appl. No. 10/691,061, filed Oct. 22, 2003.

U.S. Appl. No. 10/254,410, filed Sep. 24, 2002.

U.S. Appl. No. 10/691,090, filed Oct. 22, 2003.

U.S. Appl. No. 10/324,887, filed Dec. 18, 2002.

U.S. Appl. No. 10/661,854, filed Sep. 11, 2003.

U.S. Appl. No. 10/661,878, filed Sep. 11, 2003.

U.S. Appl. No. 10/661,789, filed Sep. 11, 2003.

U.S. Appl. No. 10/661,788, filed Sep. 11, 2003.

U.S. Appl. No. 10/661,938, filed Sep. 11, 2003.

U.S. Appl. No. 10/661,855, filed Sep. 11, 2003.

U.S. Appl. No. 10/660,830, filed Sep. 11, 2003.

U.S. Appl. No. 10/671,045, filed Sep. 24, 2003.

U.S. Appl. No. 10/691,060, filed Oct. 22, 2003.

Microsoft Internet Explorer v. 6.0, Released at least as early as Aug. 2001.

Netscape Navigator v. 6.1, Released at least as early as Jun. 2001.

Office Action Summary from U.S. Appl.; No. 10/691,060 which was mailed on Feb. 15, 2005.

Office Action Summary from U.S. Appl. No. 10/691,090 which was mailed on Mar. 10, 2005.

Office Action Summary from U.S. Appl. No. 10/691,060 which was mailed on Nov. 30, 2004.

Advisory Action from U.S. Appl. No. 10/691,060 which was mailed on Apr. 6, 2005.

Office Action Summary from U.S. Appl. No. 10/661,878 which was mailed on Oct. 8, 2004.

Office Action Summary from U.S. Appl. No. 10/661,878 which was mailed on Jan. 31, 2005.

East Search Screen Showing Copyright Date of 1999.

Dialog Pocket Guide The Dialog Corporation, Copyright date of 1998.

Freedman, Alan, "The Computer Desktop Encyclopedia" AMACOM 1996.

Microsoft Press, "Computer Dictionary" Third Edition, Microsoft Press, 1997.

www.uspto.gov Retrieved from the Interent Archive Wayback Machine Jul. 6, 2000.

www.open-ideas.org-Open _Ideas, retrieved Apr. 9, 2001.

Office Action Summary from U.S. Appl. No. 10/691,090 which was mailed on Oct. 7, 2005.

Examiner's Response from U.S. Appl. No. 10/691,060 which was mailed on Oct. 4, 2005.

Roberts, Bill, Solving the Value Equation, Knowledge Management Magazine, Jan. 2001.

www.uspto.gov retrieved from the Internet Archive Wayback Machine Nov. 8, 2004.

www.uspto.gov retrieved from the Internet Archive Wayback Machine Nov. 22, 2004.

Roberts, Ginger, Derwent Information Global Patent Sources, 1995 "Getting Stated with PatentLab-II; a Sample Analysis Scenario Included", Wisdomain, Inc. Version 1.1, May 6, 2000.

* cited by examiner

1. A method for reporting on strategic intellectual property management utilizing a computer-implemented system, comprising:
   (a) receiving a plurality of intellectual property identifiers identifying intellectual property;
   (b) identifying competing activity documentation describing a plurality of competing activities;
   (c) storing the intellectual property identifiers and the competing activity documentation in memory;
   (d) correlating the intellectual property identifiers with the competing activity documentation utilizing a processor coupled to the memory; and
   (e) reporting on the correlation between the intellectual property identifiers with the competing activity documentation utilizing an output device coupled to the processor.

CLAIM 1000

↓

((reporting and (strategic <near> intellectual <near> property) and (computer <near> implemened <near> system) .........)

STRING 1 — 1002

↓

(reporting and property and computer and system) .........)

STRING 2 — 1004

Figure 10

| IP ASSET1 | STATUS | IP ASSET1 INFORMATION | TECHNOLOGY GROUP | COMPETING PATENTS | COMPETING PATENTS INFORMATION | COMPETING ACTIVITY |
|---|---|---|---|---|---|---|
| IP ASSET1 | PENDING | PAT #, TITLE, CLAIM, ETC. | TECHNOLOGY GROUP1 | PAT #1 | PAT #, TITLE, CLAIM, ETC. | URL1 |
| | | | | PAT #1 | PAT #, TITLE, CLAIM, ETC. | FILE2 |
| | | | | PAT #3 | PAT #, TITLE, CLAIM, ETC. | NOTES4 URL3 |
| | | | | PAT #3 | PAT #, TITLE, CLAIM, ETC. | |
| IP ASSET2 | ABANDONED | PAT #, TITLE, CLAIM, ETC. | TECHNOLOGY GROUP4 | PAT #7 | | URL4 |
| | | | | PAT #5 | | FILE3 |
| | | | | | | NOTES1 |
| IP ASSET3 | ISSUED | PAT #, TITLE, CLAIM, ETC. | TECHNOLOGY GROUP3 | PAT #1 | | URL6 |
| | | | | PAT #6 | | FILE12 |
| | | | | PAT #2 | | NOTES3 |
| TECH GROUP1 | | | | | | URL1 |
| TECH GROUP2 | | | | | | NOTES4 |

Figure 11

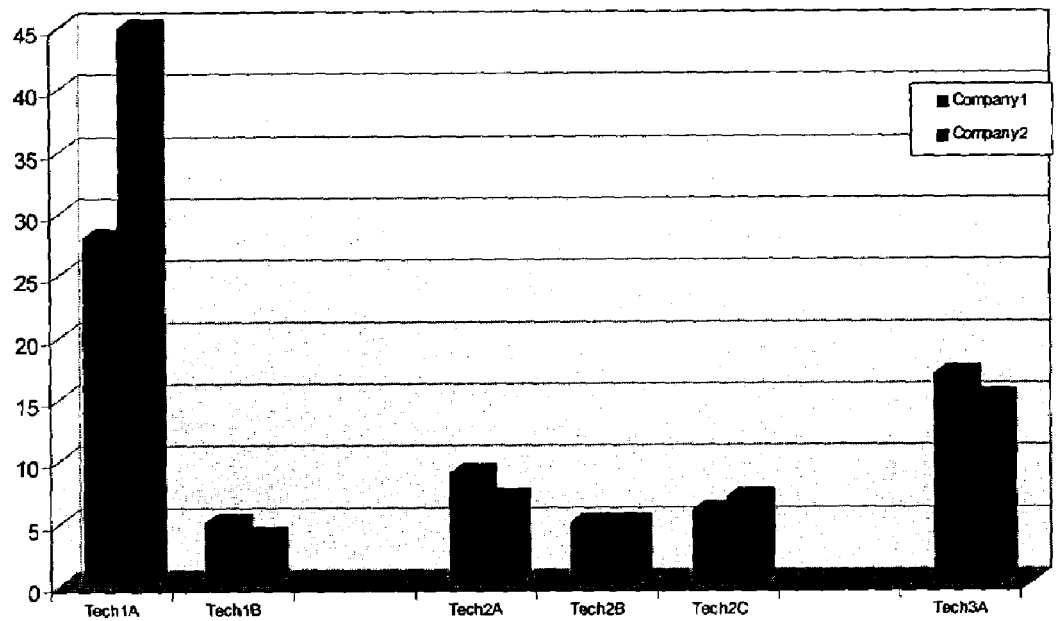
Figure 13B

1600

1700

NETWORK BROWSER GRAPHICAL USER INTERFACE FOR MANAGING WEB CONTENT

RELATED APPLICATION(S)

The present application is a continuation of U.S. application Ser. No. 10/671,045 filed Sep. 24, 2003, which, in turn, is a continuation-in-part of U.S. application Ser. No. 10/324,887 filed Dec. 18, 2002, which, in turn, is continuation-in-part of prior U.S. application Ser. No. 10/254,410 filed Sep. 24, 2002, which claims priority from U.S. provisional application 60/324,941, filed Sep. 24, 2001, which are all incorporated herein by reference.

BACKGROUND AND FIELD OF THE INVENTION

The present invention relates to graphical user interfaces, and more particularly to the use of network browser interfaces.

DISCLOSURE OF THE INVENTION

A network browser graphical user interface is provided for use in association with a network browser. Included is a network browser window associated with a network browser for displaying content associated with uniform resource locators (URLs) during network browsing. Also displayed is a plurality of identifiers adjacent to or separate from the window in which the content is displayed. In use, a user is allowed to pre-select at least one of the identifiers. Moreover, after the pre-selection, content associated with at least one URL displayed during use of the network browser is correlated with the pre-selected identifier.

BRIEF DESCRIPTION OF THE DRAWINGS

FIG. 10 shows the manner in which a claim may be converted into a search string.

FIG. 11 is a chart showing a data structure associated with the information collected, in accordance with one embodiment.

FIGS. 13A–B illustrate other exemplary technology map reports, in accordance with a 3-D embodiment.

DETAILED DESCRIPTION

The following description is the best embodiment presently contemplated for carrying out the present invention. This description is made for the purpose of illustrating the general principles of the present invention and is not meant to limit the inventive concepts claimed herein.

Figure 1:
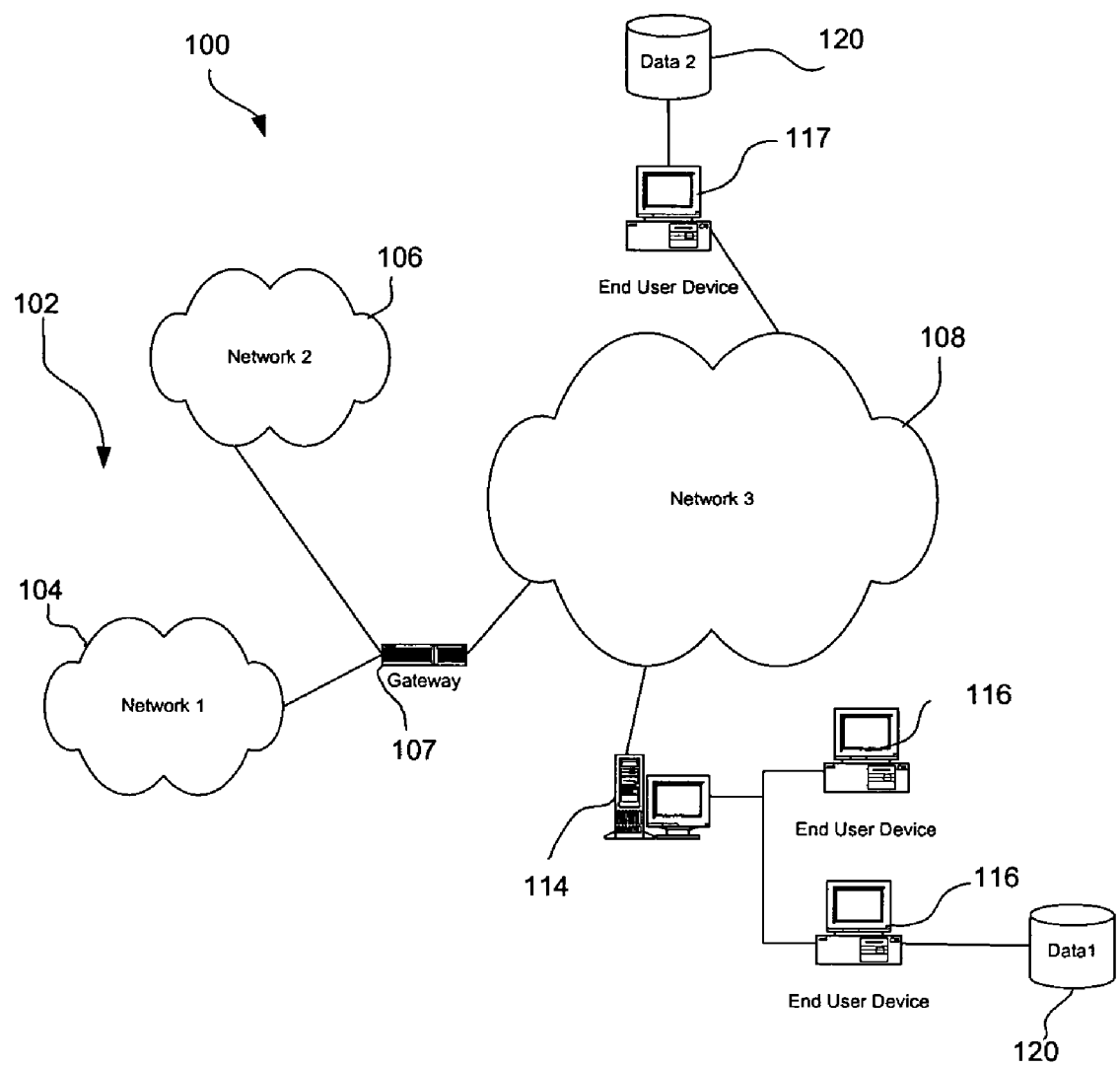
FIG. 1 illustrates a network architecture, in accordance with one embodiment.

FIG. 1 illustrates a network architecture 100, in accordance with one embodiment. As shown, a plurality of networks 102 are provided including a first network 104 and a second network 106. Also included is at least one gateway 107 coupled between the networks 102 and a third network 108. In the context of the present network architecture 100, the networks 104, 106, 108 may each take any form including, but not limited to a local area network (LAN), a wide area network (WAN) such as the Internet, a wireless network, etc. Further, any number of networks may be included.

In use, the gateway 107 serves as an entrance point from the networks 102 to the third network 108. As such, the gateway 107 may function as a router, which is capable of directing a given packet of data that arrives at the gateway 107, and a switch, which furnishes the actual path in and out of the gateway 107 for a given packet.

Further included is at least one server 114 coupled to the third network 108, and which is accessible from the networks 102 via the gateway 107. It should be noted that the server(s) 114 may include any type of computing device/groupware. Coupled to each server 114 is a plurality of user devices 116. Such user devices 116 may include a desktop computer, lap-top computer, hand-held computer, printer or any other type of logic. It should be noted that a user device 117 may also be directly coupled to any of the networks, in one embodiment.

For reasons that will soon become apparent, the user devices 116 and/or server(s) 114 may be equipped with databases 120, i.e., collections of data. Such databases may include information on intellectual property. For example, the databases 120 may include a plurality of intellectual property identifiers which each identify a specific piece of intellectual property. In the context of the present description, intellectual property refers to any patent, patent application, invention disclosure, trademark, copyright, trade secret, or any other granted or potential right in an intangible entity. In the case of patents, patent applications, and invention disclosures, the aforementioned identifier may include a patent number, patent application serial number, issue date, filing date, docket number, and/or any other information which identifies and/or is associated with the intellectual property.

As an option, for reasons that will soon become apparent, the databases 120 may include business logic include information as to a status of particular products and/or product cycles associated (i.e. protected by) the intellectual property identifiers, current intellectual property budget constraints, ratings associated with the patents, a list of key competitive companies, etc. corresponding with the intellectual property identifiers. Still yet, such ratings may be manually and/or automatically generated based on a traditional factors such as a visibility of the technology covered by a particular patent (important in ascertaining infringement), whether the technology covered by a particular patent is to be adopted as a standard, the level of fundamentality of the technology covered by a particular patent, etc. Thus, one or more databases are provided with any of the foregoing information.

Moreover, the intellectual property identifiers in the databases 120 may be owned by a particular company or other entity in the form of a docketing database or the like. In the alternative, the databases 120 may be a comprehensive set of intellectual property identifiers which are currently granted, published, and/or otherwise received by a governmental authority, i.e. United States Patent Office.

In addition, servers coupled to remote networks 104, 106 and/or the third network 108 may also have access to competing activity documentation such as online information, product information, advertising and promotional materials, etc.

Figure 1A:
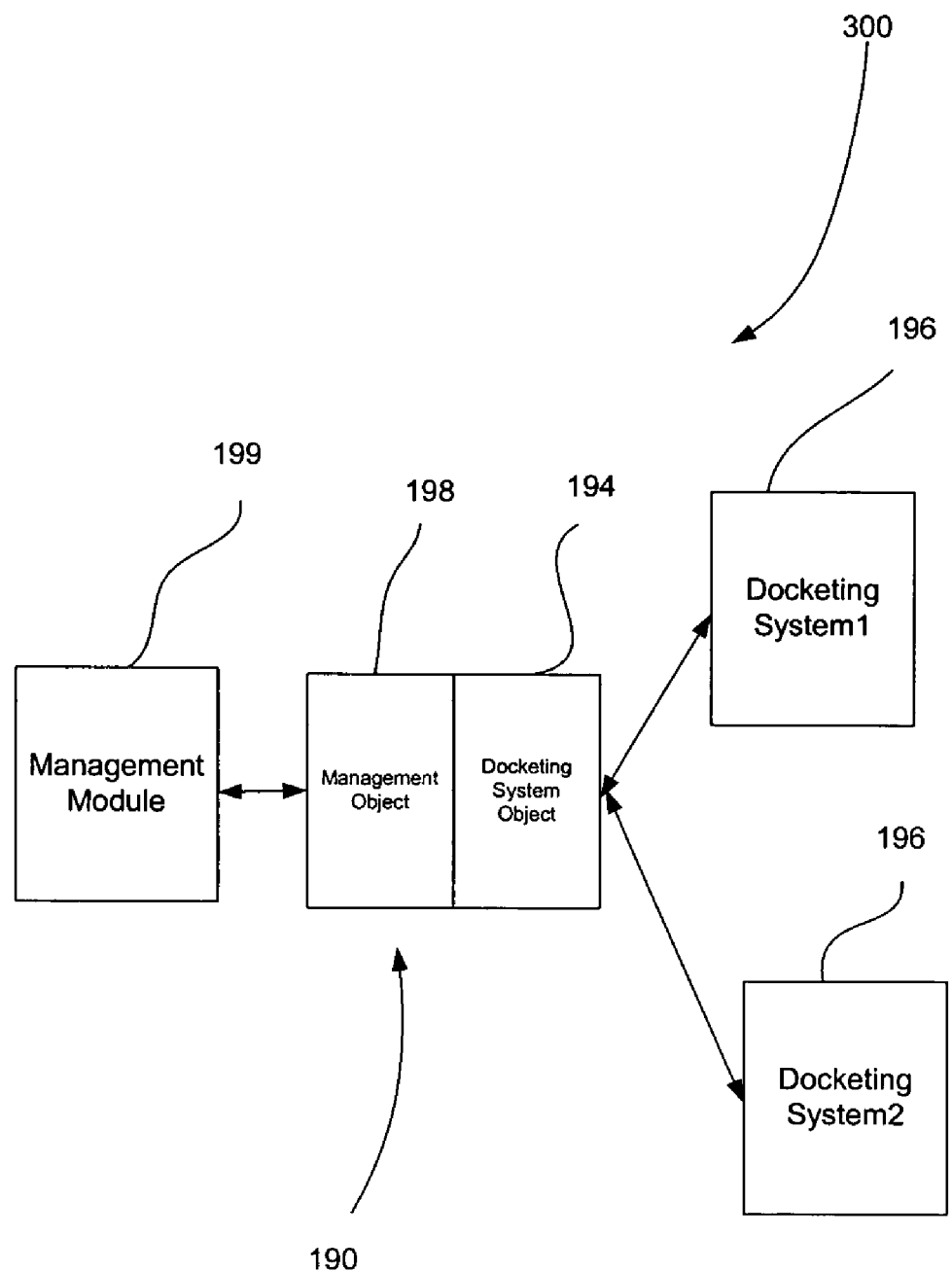
FIG. 1A illustrates an application program interface for interfacing a first module situated in a corporate environment and at least one other module in a separate service provider module.

FIG. 1A illustrates an application program interface 190 for interfacing a first module situated in a corporate environment and at least one other module in a separate service provider module. As an option, the interface disclosed herein may be integrated with the other techniques disclosed herein. In the alternative, the present technique may be implemented in any desired context.

As shown, an intellectual property application program interface 190 is provided. Further shown is at least one docketing system object 194 for interfacing a firm docketing system 196 (which could be one of the databases shown in FIG. 1) adapted for docketing intellectual property and dates associated therewith. Such one or more firm docketing systems 196 may be associated with particular lawfirms, etc.

Further included is an intellectual property management object 198 for communicating information with the docketing system object 194. The intellectual property management object 198 is capable of interfacing with a management module 199 for processing the information associated with the docketing systems associated with a plurality of different firms. As an option, such processing may be included with the various techniques disclosed herein, or another type of processing involving the information from each of the docketing systems 196. For example, the management module may itself just constitute a docketing system itself that is privy to the information of all of the other docketing systems 196 so as to provide a "global" cumulative view of the docketing information. Further, the management module 199 may be interfaced to the aforementioned comprehensive database or any other resources for carrying out any of the functionality set forth herein.

Moreover, the information is transmitted over a wide area network (i.e. the Internet, telecommunication network, etc.). It should be noted that the application program interface 190 may be resident on the at least one firm docketing system 196 and/or the management module 199.

By this design, the present embodiment enables the following functionality in combination with information provided by the docketing systems associated with the plurality of different firms. In the context of the present embodiment, such information may include any information relating to the intellectual property (i.e. patents, etc.) that is available from the docketing system.

To accomplish this, the application program interface 192 may include passwords, user names, etc. for initiating communication with the docketing systems. Still yet, the application program interface 192 may include formatting rules for allowing extraction of information. For example, the application program interface 192 may include logic to recognize that a certain field "x" includes a patent number and another field "y" includes a filing date, etc. This may be different for different docketing systems 196.

Thus, a corporate patent manager may have access to a combination of information from a plurality of different docketing systems associated with different firm that act as patent prosecutor service providers for the corporate entity. This may not only eliminate the need to "double docket," but may allow the corporate entity to review the "big picture" of the corporate patent/patent application portfolio by combining the information from the different firm service providers. Even still, the application program interface 192 may further interface a confidential USPTO patent application information retrieval (PAIR) system to supplement, verify, etc. the data.

Figure 2:
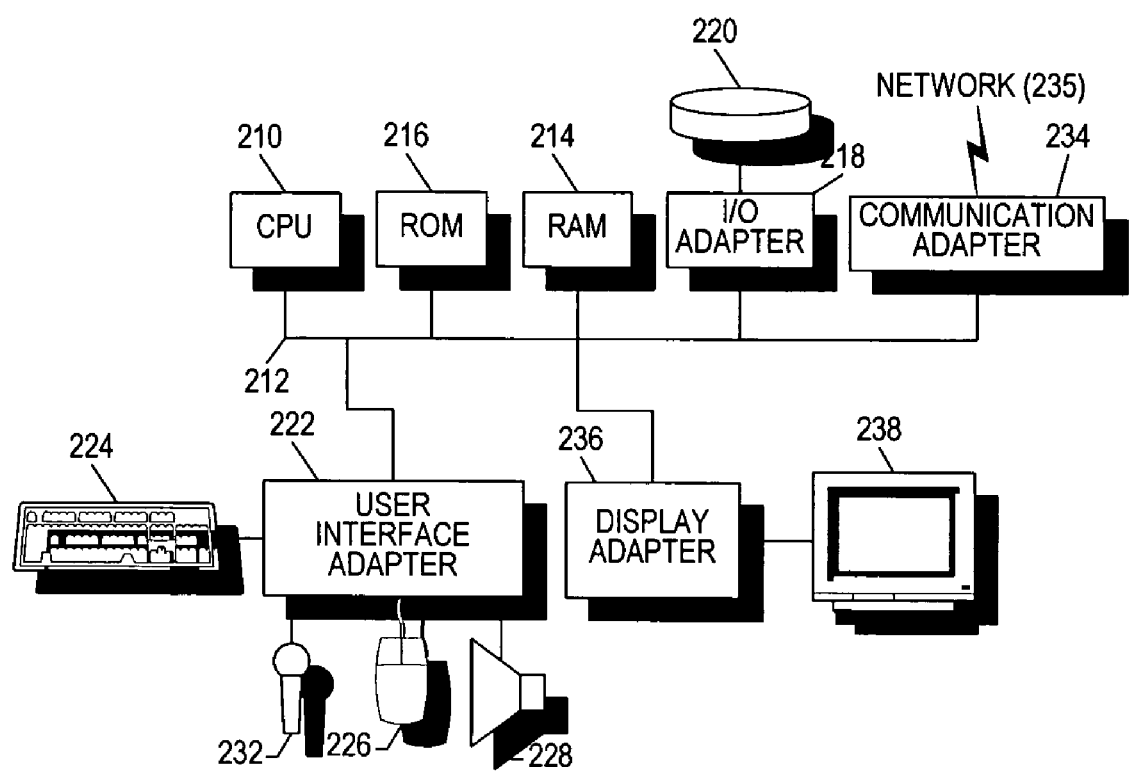
FIG. 2 shows a representative hardware environment that may be associated with the various network components of FIG. 1, in accordance with one embodiment.

FIG. 2 shows a representative hardware environment that may be associated with the various network components of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
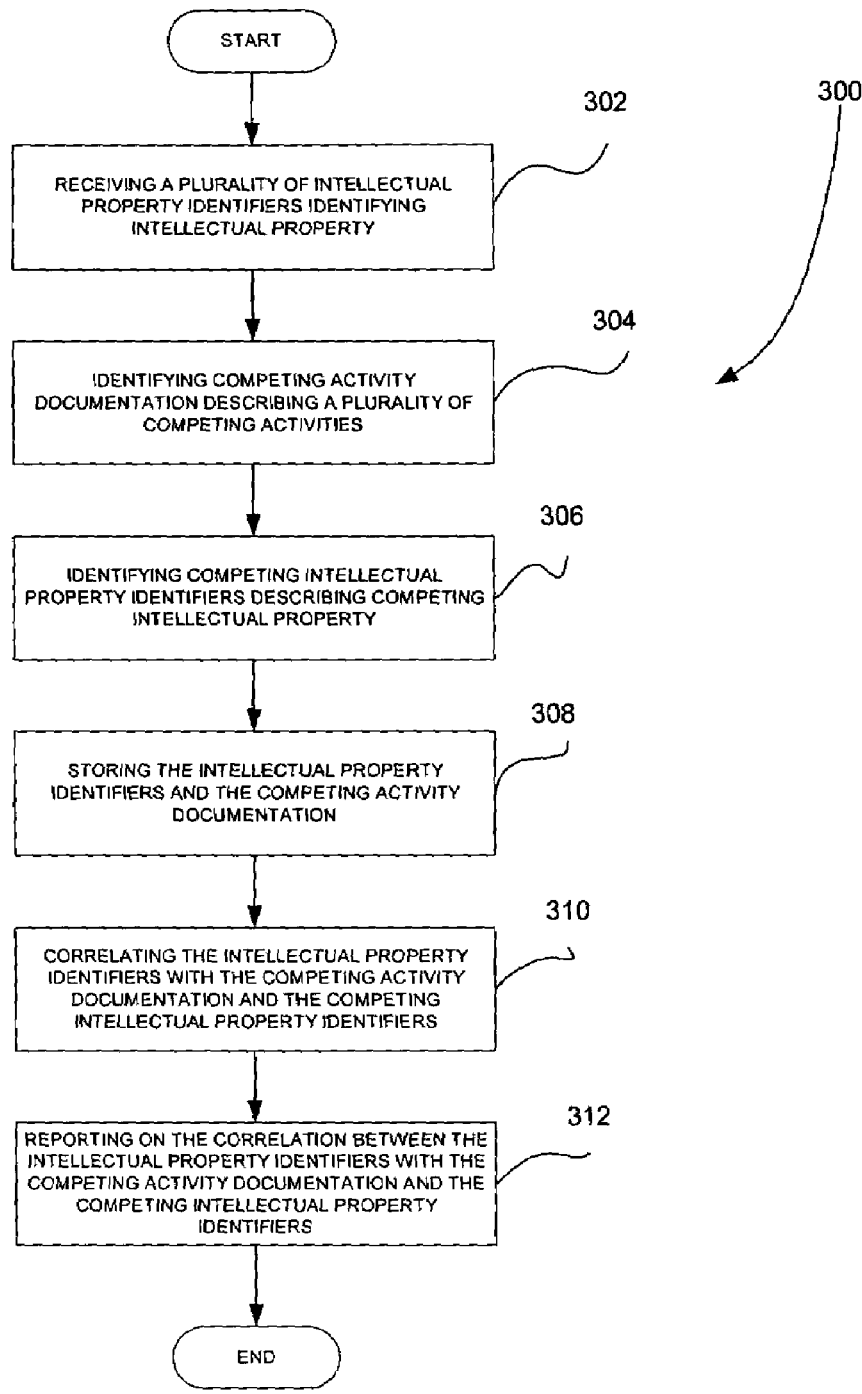
FIG. 3 illustrates a method for reporting on competing activity during strategic intellectual property management utilizing a computer-implemented system, in accordance with one embodiment.

FIG. 3 illustrates a method 300 for reporting on competing activity during strategic intellectual property management utilizing a computer-implemented system, in accordance with one embodiment. Initially, in operation 302, a plurality of intellectual property identifiers identifying intellectual property are received. In the context of the present description, the intellectual property identifiers may be received in any manner. For example, the intellectual property identifiers may be manually entered, received from one of the databases 120, transmitted over a network, gleaned or "mined" from a collection of data, etc. More information will be set forth hereinafter regarding an exemplary way of receiving the intellectual property identifiers.

Further, in operation 304, competing activity documentation is identified describing a plurality of competing activities. Similar to the intellectual property identifiers, the competing activity documentation may be received by manual entry, from any sort of database, from the Internet, from a remote application, etc. Moreover, the competing activity documentation refers to any documentation relating to a competing activity, which, in the context of the present description, refers to any activity that does or potentially would infringe on or interfere with the rights (or potential rights) appurtenant to the intellectual property. More information will be set forth hereinafter regarding the competing activity documentation, as will an exemplary way of identifying the competing activity documentation.

As will soon become apparent, competing intellectual property identifiers may be used to identify competing intellectual property in a manner similar to that in which the intellectual property identifiers are used to identify the intellectual property. See operation 306. While not currently shown, it should be noted that various technology categories may also be defined for later correlation.

Next, in operation 308, such intellectual property identifiers and the competing activity documentation are stored in memory. Moreover, the intellectual property identifiers are correlated with the competing activity documentation utilizing a processor coupled to the memory (see FIG. 2). See operation 310. This correlation may include showing any particular relationship between the intellectual property identifiers and the competing activity documentation for the purposes of intellectual property management.

In operation 312, such correlation between the intellectual property identifiers and the competing activity documentation may then be reported upon utilizing an output device coupled to the processor (again see FIG. 2). More information will now be set forth regarding each of the operations set forth herein above.

Registration of Intellectual Property (302/304)

Figure 4:
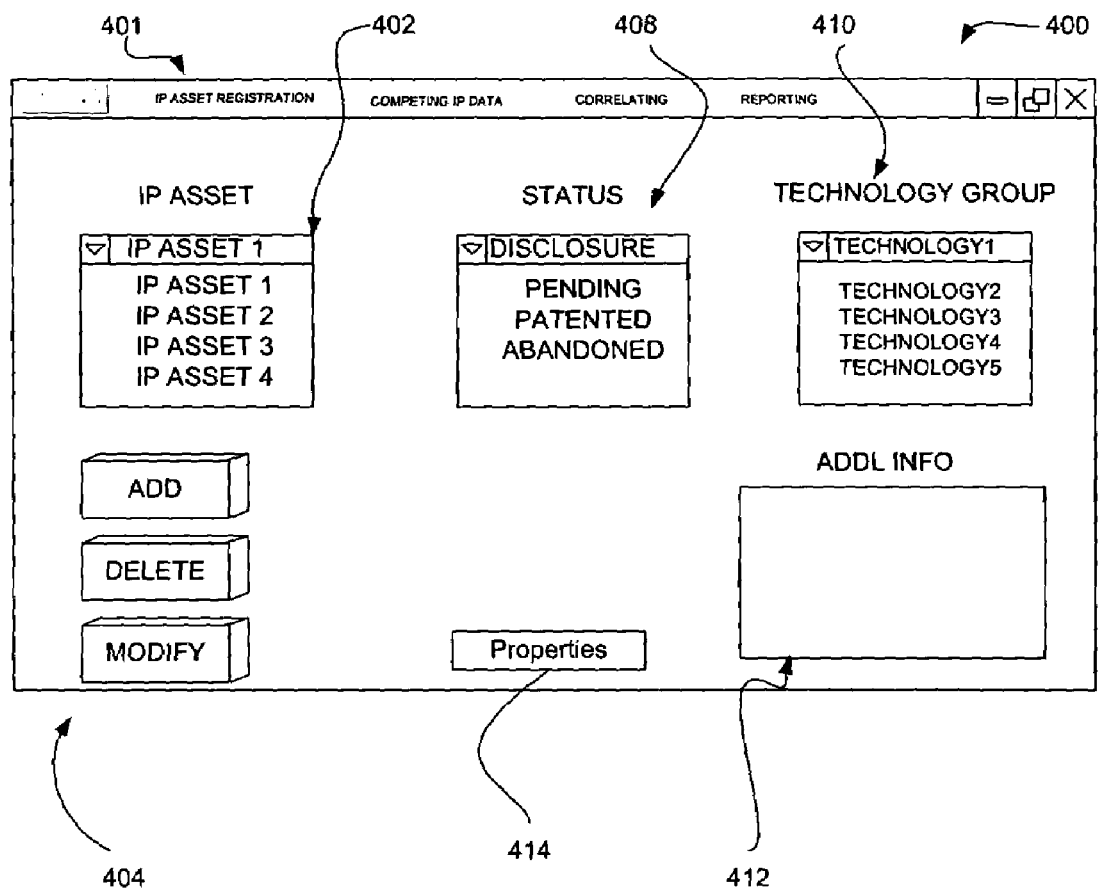
FIG. 4 illustrates an exemplary graphical user interface for registration of intellectual property, in accordance with one embodiment.

FIG. 4 illustrates an exemplary graphical user interface 400 for registration of intellectual property, in accordance with one embodiment. While the current graphical user interface 400 is designed for the purpose of registration of the intellectual property of a particular company, individual, or entity; any other mechanism may be utilized per the desires of the user.

As will soon become apparent, the exemplary graphical user interface 400 is a single interface among many that may be used as a software tool to accomplish the various operations set forth during reference to FIG. 3. Accordingly, other graphical user interfaces associated with other operations of FIG. 3, may be accessed via registration, competing patent data, competing activity documentation, and reporting tabs 401.

As shown, an intellectual property identifier pull-down window 402 may be provided for selecting an existing intellectual property identifier or adding another. Such pull-down window 402 may be utilized in conjunction with add, delete, and modify icons 404 to accomplish this task. Once added or selected, information relating to the present intellectual property identifier may be entered via various other fields and/or pull-down windows.

For example, a status pull-down window 408 may be provided for assigning a status of the intellectual property identified by the intellectual property identifier. In the case of patents, such status may include disclosure, pending, patented, and/or abandoned. Of course, any other status may be used per the desires of the user.

Still yet, a technology group pull-down window 410 may be provided for assigning the intellectual property identified by the intellectual property identifier to a technology group. Again, the technology group may be selected from an existing list of technology groups or generated using the add, delete, and modify icons 404. It should be noted that the technology groups refer to any technology genres in which the intellectual property identified by the current intellectual property identifier may be categorized. Such technology categories may be identified with descriptive names of such technology categories.

Other information may be associated with the intellectual property identified by the intellectual property identifier using the current graphical user interface 400. For example, exemplary claims associated with the intellectual property and/or other pertinent information may be entered, cut-and-pasted, dragged-and-dropped, etc. utilizing a field 412 of the current graphical user interface 400.

All of the information stored via the interface 400 can be stored in a central registration database, thereby allowing multiple users to each access individual instances of the interface 400. As an option, data associated with IP assets can be merged into the registration database from a docketing system or other repository.

A screen showing a report of the current registration information of the intellectual property associated with a currently selected intellectual property identifier can be displayed upon selection of a Properties button 414. The registration information can include all or a portion of the information added using the graphical user interface shown in FIG. 4.

Figure 5:
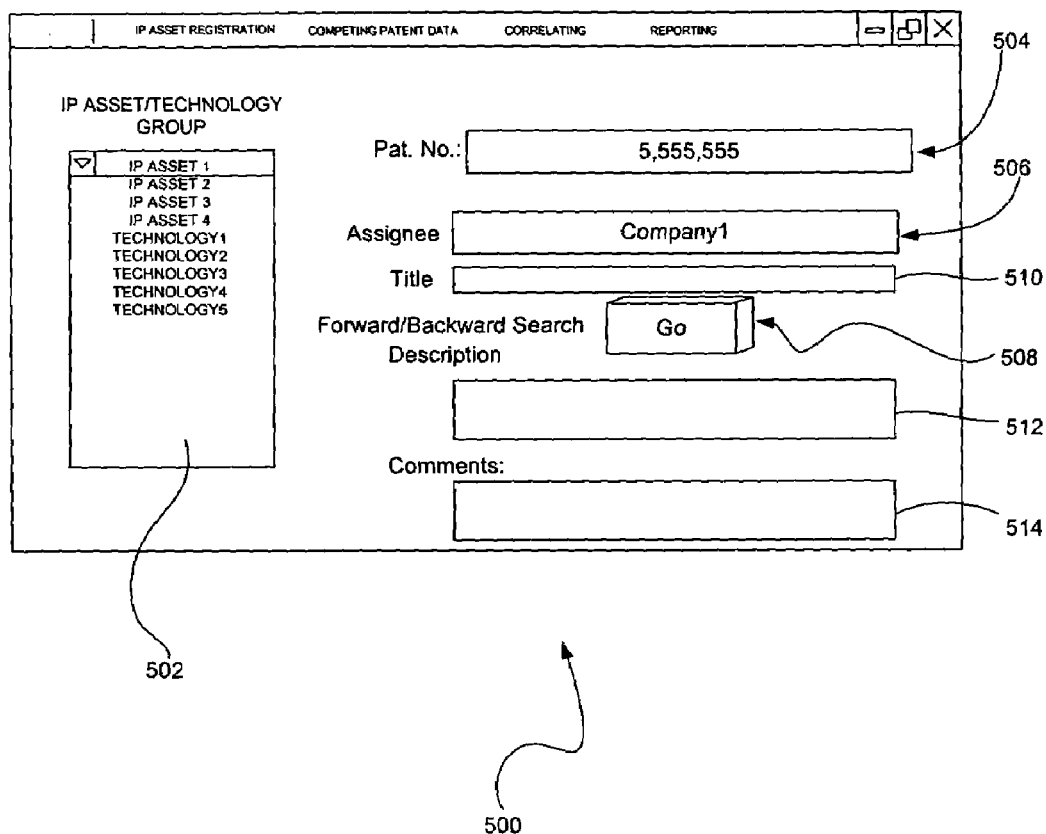
FIG. 5 illustrates an exemplary graphical user interface for registration of competing intellectual property associated with intellectual property identifiers, in accordance with one embodiment.

FIG. 5 illustrates an exemplary graphical user interface 500 for registration of competing intellectual property associated with the intellectual property identifiers, in accordance with one embodiment. While the current graphical user interface 500 is designed for the purpose of registration of the competing intellectual property of a particular company, individual, or entity; it should be noted that any other mechanism may be utilized per the desires of the user.

As shown in FIG. 5, either one of the intellectual property identifiers or technology groups may be selected utilizing an intellectual property identifier/technology group pull-down window 502. It should be noted that such pull-down window 402 may be utilized in conjunction with unillustrated add, delete, and modify icons to select or add intellectual property identifiers and/or technology groups that are not currently registered.

Also included is a patent number field 504 and an assignee field 506 for entering information (i.e. a competing intellectual property identifier, corresponding assignee, respectively) regarding competing intellectual property. Preferably, the patent number field includes a pull-down menu which allows the user to select previously entered competing intellectual property. Of course, any other pertinent information may be gathered per the desires of the user. By selecting an intellectual property identifier and/or technology group item from the pull down window 502 and filling in/selecting a patent number in the patent number field 504, the user, in effect, correlates the competing intellectual property with either the intellectual property identifiers and/or technology groups. Note that the patent number field may include any other type of identifier, such as a filing number, internal reference number, etc. of the competing intellectual property.

In an alternate embodiment, the competing intellectual property identifiers may be collected by doing a "forward search" or "backward search" utilizing information positioned on the patent, utilizing the aforementioned databases 120 of FIG. 1, or any other data source. As an option, such a "forward search" or "backward search" may be initiated automatically or manually upon the selection of a corresponding icon 508 found on the graphical user interface 500. As an example, a backward search can be performed by identifying patents listed on the face of the patent itself or in its text.

As an option, a title field 510 may be provided for entering/displaying the title of the patent whose number appears in the patent number field 504. Also optionally, a description of the patent can be entered/displayed in a description field 512. Such description can include the abstract of the patent, a user-generated description, etc. Further, a comments field 514 can be provided for entering/displaying any type of additional information regarding the competing intellectual property. Additional fields (not shown) can also be included.

The patent title, assignee, description, etc. can be retrieved automatically from a database upon entry (or selection) of the patent number. One database from which the information can be retrieved is the patent database of the U.S. Patent Office, which is accessible via the Internet.

Identifying Competing Activity and Correlating the Same (306/308)

Intelligence used during patent selection and procurement can take on many different forms. In the context of the present discussion, intelligence may include any information relating to the contents of a patent portfolio and the activities conducted by a company. Ideally, this intelligence is collected for both the company whose portfolio is being managed, and for any competitor with patents and/or activities that overlap those of the company.

Market Intelligence

With the advent of the Internet and the information age, the ability to gather market intelligence has been tremendously enhanced. In the interest of marketing their products, companies disclose a sizeable amount of information on web-sites to inform the public of product and service activities. This information may take various forms such as press releases, data sheets, user manuals, white papers, etc. Further, many independent third-party organizations provide product and service reviews. Of course, traditional information gathering methods such as reverse engineering, trade shows, etc. are still viable though often more expensive ways of collecting market intelligence.

Patent Intelligence

Less than 10 years ago, the most prevalent method used to collect patent intelligence involved sitting down in the United States Patent Office (USPTO) search room and thumbing through "shoes" of patents. Today, however, on-line databases provide an effective means of accessing a vast amount of information on not only United States patents and patent applications, but also foreign patents, non-patent literature, etc. Examples of such publicly available on-line databases include the USPTO patent search portal (http://www.uspto.gov/patft/index.html) and the Delphion® database (http://www.delphion.com).

In addition to actively searching for patents using the foregoing databases, various services are available whereby search queries are saved and automatically run on a periodic basis. Such services render automatic e-mail alerts or the like to provide a notification of recently published patents and applications matching the search criteria.

Using the foregoing tools, a great deal of valuable information may be obtained for use when building a patent portfolio. As the size of a patent portfolio increases, there is a coinciding need to organize this vast amount of information in a manner in which it can be effectively employed.

Figure 6:
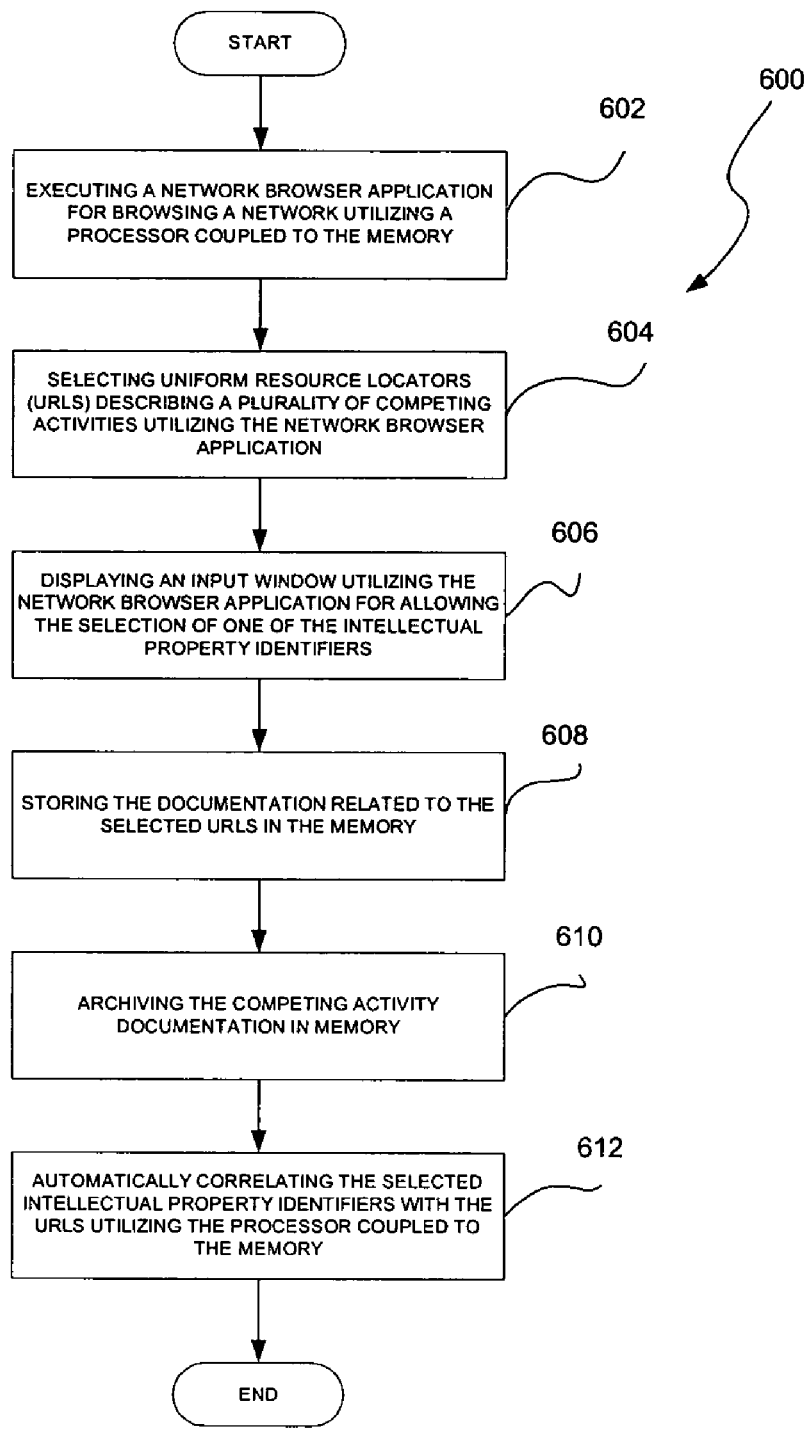
FIG. 6 illustrates a method for collecting competing activity documentation, in accordance with operation 306 of FIG. 3.

FIG. 6 illustrates one possible method 600 for collecting competing activity documentation, in accordance with operation 306 of FIG. 3. Such process begins in operation 602, by executing a network browser application for browsing a network utilizing a processor coupled to the memory (see FIG. 2). Such network browser application may include, but is not limited to MICROSOFT INTERNET EXPLORER, NETSCAPE NAVIGATOR, or any other application capable of allowing browsing of a network such as the Internet.

During use, in operation 604, uniform resource locators (URLs) to data sites/files describing a plurality of competing activities are selected utilizing the network browser application. It should be noted that such selection process may be accomplished in any desired manner, such as simply browsing the particular URL.

Once the URL has been selected, an input window may be displayed utilizing the network browser application for allowing the selection of one of the intellectual property identifiers. See operation 606. Such selection may include manual entry of one of the intellectual property identifiers, or the selection thereof via a list. More information on one exemplary embodiment of such window will be set forth in greater detail during reference to FIG. 7. In an alternate embodiment, the appropriate intellectual property identifier(s) may be identified in a window separate from the network browser application, such that any competing activity documentation selected during use of the network browser application results in automatic correlation with the pre-selected intellectual property identifier(s).

The documentation related to the selected URLs is then stored in the memory, as set forth in operation 608. Such documentation can include web pages, articles, spreadsheets, slide shows, compressed documents such as files in Portable Document Format (.pdf), etc. and can even include multimedia files and streaming multimedia. Still yet, in operation 610, the documentation related to the selected URLs may be archived for later use. This feature is critical for storing evidence of such competing activity, as content of URLs are often subject to change.

Preferably, the URL or pointer information is stored with the documentation. Also preferably, the date is also saved with the documentation to show when the documentation was discovered. The date is ideally retrieved from an independent site, such as from the National Institute of Standards and Technology site (http://nist.time.gov/timezone.cgi?Pacific/d/-8/java), so that the date is virtually indisputable.

Next, in operation 612, the selected intellectual property identifiers are correlated with the URLs utilizing the processor coupled to the memory (see FIG. 2).

Figure 7:
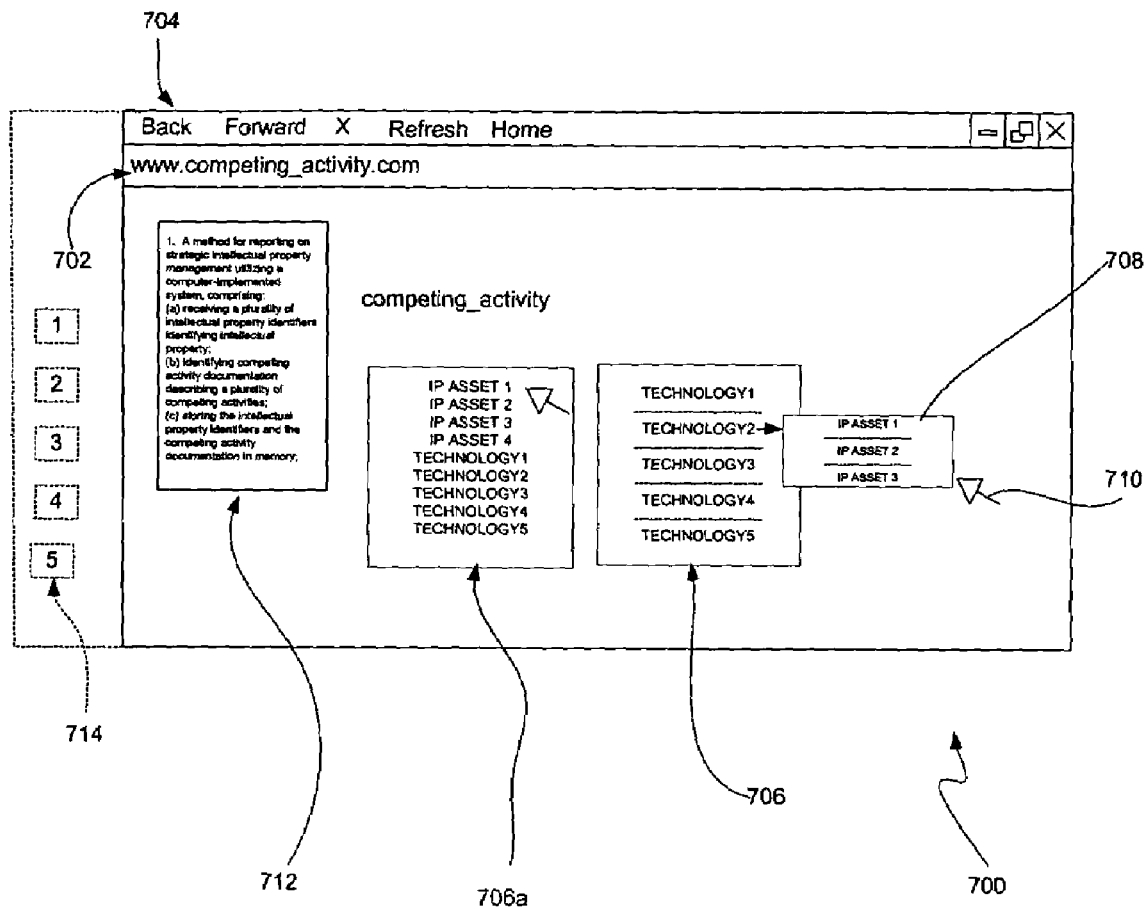
FIG. 7 illustrates an exemplary graphical user interface for collecting competing activity documentation from the Internet utilizing a network browser application, in accordance with one embodiment.

FIG. 7 illustrates an exemplary graphical user interface 700 for collecting competing activity documentation from the Internet utilizing a network browser application, in accordance with one embodiment. While the graphical user interface 700 described herein is designed for the purpose of collecting such Internet-based competing activity documentation; it should be noted that any other designs may be utilized per the desires of the user.

As shown in FIG. 7, a user may select or enter a URL using a URL field 702, in combination with a plurality of controls 704. A page or data associated with the URL is displayed on the browser, upon which a pop-up window 706 may be displayed on the network browser. It should be understood that the pop-up window 706 may be displayed in response to a certain mouse click (i.e. right mouse click), a keyboard command, or any other prompting mechanism. In the alternative, the pop-up window 706 may continuously be displayed when utilizing the network browser in a data collection mode.

In one embodiment, the pop-up window 706 may include a plurality of technology categories which may be selected for correlation with the present competing activity documentation. As an option, selection of the technology categories may prompt a sub-window 708 to be displayed showing a plurality of intellectual property identifiers previously correlated with the selected technology category. By this design, a specific technology category or intellectual property identifier may be selected with a cursor 710 in order to correlate the competing activity documentation therewith.

Note that the documentation stored may be just the content item positioned under the cursor and/or the entire page.

In an alternate embodiment, a similar pop-up window 706a may be used which delineates both technology categories and intellectual property identifiers on a single window for selection purposes.

In another alternate embodiment, the competing activity documentation (or the pointer to it) may be dragged and dropped into a "bucket" upon which it is stored as set forth above. See optional buckets 714 in FIG. 7. Further, a bucket may be provided for each technology group and/or intellectual property identifier. In the latter case, the individual bucket may be accessed by a series of submenus, such as the submenus 706, 708 described above. As an option, the various buckets may be selected (i.e. clicked) for identifying further information about the associated technology group and/or intellectual property identifier to facilitate the search and collection of competing activity.

Still yet, a claim of a particular IP asset associated with a user's search may be selectively displayed in a separate window 712 or some other manner that allows the user to inspect the claim during the search for competing activity. This window 712 may share the screen with the network browser or be placed thereover.

In any case, once selected, a URL and any associated text, links, pictures, other content, etc. may be stored for correlation with the appropriate technology categories and intellectual property identifiers. Such correlation may then be reported later, as will soon become apparent.

It should be noted that the collection of the foregoing intelligence may be a manual process which may be enhanced by the foregoing techniques. Of course, automatic "mining" techniques may be employed to automatically collect information on a periodic basis, or on a user-defined timeline. In any case, it is desired to update the information in the database on a continuous basis, i.e., in real time as data is received or daily, bi-weekly, etc.

Figure 8:
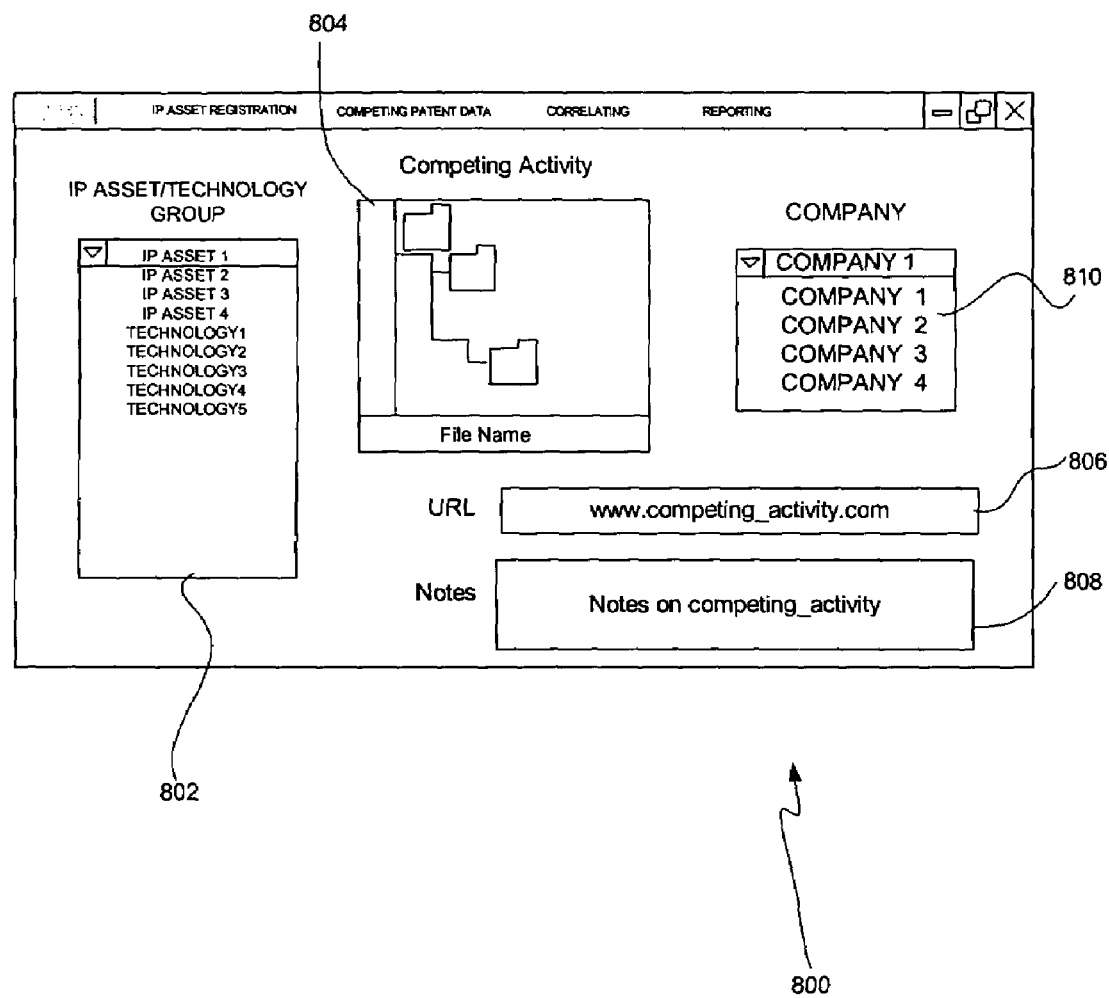
FIG. 8 illustrates an exemplary graphical user interface for alternatively collecting competing activity documentation from the Internet utilizing any one of three available methods, in accordance with one embodiment.

FIG. 8 illustrates an exemplary graphical user interface 800 for alternatively collecting competing activity documentation from the Internet utilizing any one of three available methods, in accordance with one embodiment. While the current graphical user interface 800 is designed for the purpose of collecting competing activity documentation in three different ways; it should be noted that any other designs may be utilized per the desires of the user.

As shown, an intellectual property identifier pull-down window 802 may be provided for selecting an existing intellectual property identifier or adding another. Such pull-down window 802 may be utilized in conjunction with unillustrated add, delete, and modify icons to accomplish this task. Once added or selected, information regarding the present intellectual property identifier may be entered via various other fields and/or pull-down windows.

As shown, a first file structure field 804 may be used to select competing activity documentation stored in memory of a present machine or across a network. By this file structure field 804, a user may browse various folders where such documentation may have been previously stored.

A second method of collection is provided by way of a URL entry field 806. Such URL entry field 806 may simply be filled with URLs uncovered during use of network browser application. Again, the user may type in the URL, paste a URL in, drag and drop a URL, etc. As an option, the present embodiment may automatically link to the URL via a network upon entry of the URL, retrieve information from the associated site, and store information related thereto.

Still yet another method of collection may be provided via a notes entry field 808 which may be used to fill in information on competing activity. Further, a user may choose to cut and paste and/or drag and drop information in such field.

Optionally, a company pull-down window 802 may be provided for selecting an existing intellectual property identifier or adding another. Such pull-down window 802 may be utilized in conjunction with unillustrated add, delete, and modify icons to accomplish this task. In use, a user may enter a company name to associate with the competing activity documentation. As will soon become apparent, this may be useful during reporting.

Figure 9:
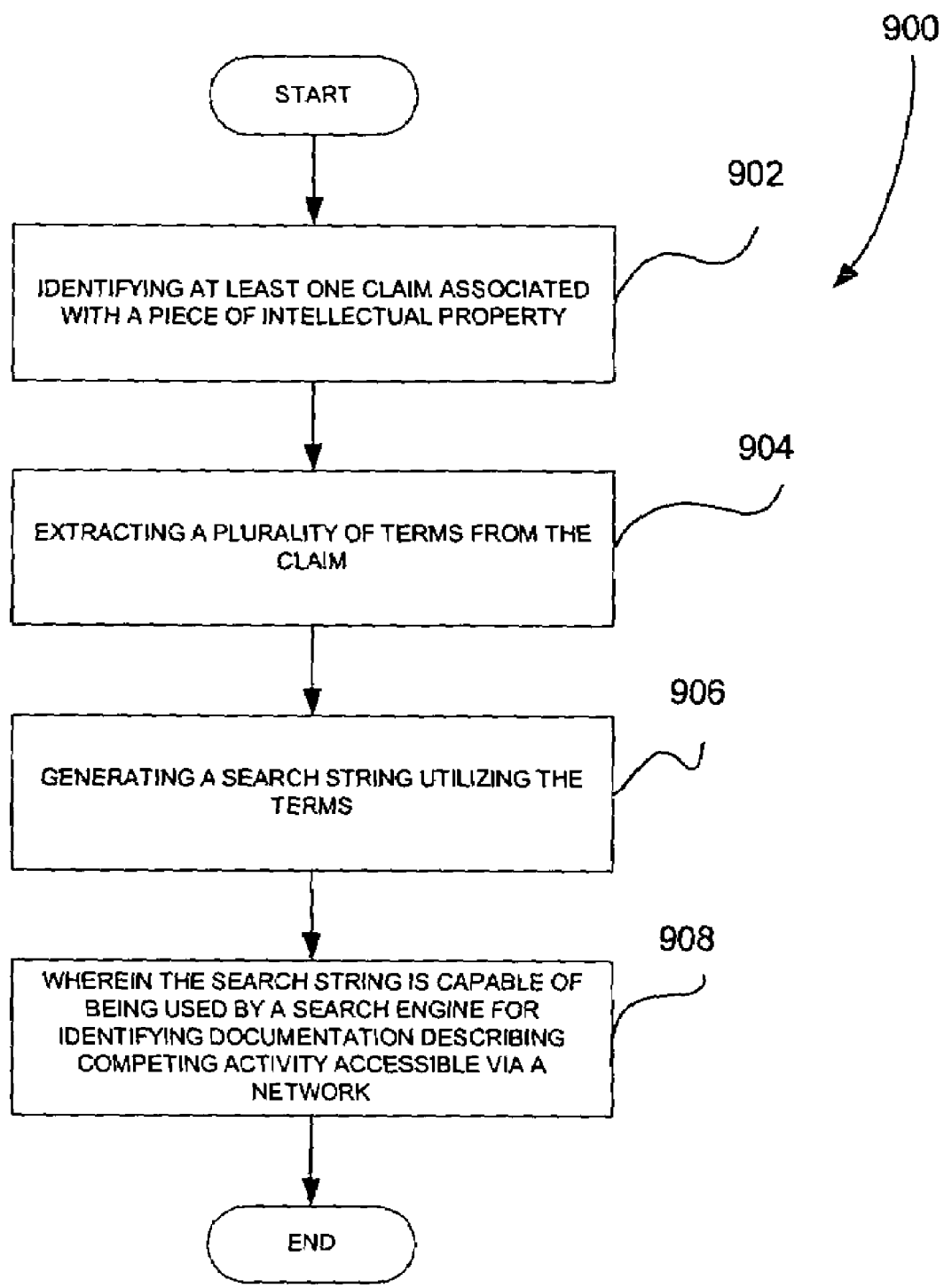
FIG. 9 illustrates a method for further facilitating the identification of the competing activity documentation, in accordance with one embodiment.

FIG. 9 illustrates a method 900 for further facilitating the identification of the competing activity documentation, in accordance with one embodiment. In particular, a technique is provided for generating a search string for collecting competing activity correlating with intellectual property. Initially, in operation 902, at least one claim associated with intellectual property is identified. As an option, this may be accomplished by one of the report functions to be set forth hereinafter. In the alternative, the text of the claim may be simply entered into a predetermined field or the like. Further, the text of the claim may be automatically retrieved from a database and inserted in the field.

Next, in operation 904, a plurality of terms are extracted from the claim. This may be accomplished in numerous ways. For example, only verbs and/or nouns may be extracted. Further, only repeated verbs and/or nouns may be extracted. The foregoing preferably occurs without any user interaction. As an option, a list of the extracted terms can be presented to a user to allow the user to add to or deleted from the list of proposed terms. Further, the user may be allowed to prioritize some or all of the terms in the list, e.g., placing the most important term first, the second most important term in the second position, and so on. As an option, terms repeated in the claims may be given a higher priority than other terms, including those repeated less often.

In operation 906, a search string is generated utilizing the terms. Such search string may include a plurality of terms with "AND" or other searching operators (i.e. <near>, <sentence>, etc.) therebetween. Further, certain key words such as "claim", "said", etc. may be deleted along with other legalese and numerical words, since such language is customary in all claims. As an option, a synonym database may be used to identify synonyms to be "ORed" with the associated original term. This may be used to increase the breadth of the search.

Such search string may be used by a search engine for identifying documentation describing competing activity accessible via a network. See operation 908. As an option, such search string may be automatically submitted to a predetermined search engine in response to entry of the claim or entry of a command. If the search terms have been prioritized, the search engine preferably gives more weight to the search terms with higher priority.

A thesaurus may be used to generate search queries using alternate words but retaining the meaning of the terms. Preferably, multiple searches are performed for each string generated in operation 906, each search using a different combination of terms/synonyms. This ensures that competing activity is not overlooked merely because of varying terminology.

Moreover, the search string may be automatically or manually modified based on the results of the search. For example, the terms may be used with <near>, <sentence>, or other more limiting operations (or operands) instead of the AND operator/operand. Alternatively, the terms themselves may be modified. By way of example, only repeated words may be used in the second try.

The process described above with respect to FIG. 9 may be performed upon user request, automatically upon occurrence of an event (such as entry of a new patent, a system wide order to perform a search for designated patents, etc.), at predetermined intervals (for automatic information gathering), etc.

FIG. 10 shows the manner in which a claim 1000 may be converted into a search string 1002. Further shown is the manner in which the search string 1002 may be modified to improve the search. Note search string 1004. Similarly, the modification may expand a shorter string to include more terms, as in a modification of string 1004 to string 1002. As an option, color mapping may indicate or highlight the terms found in the subject material.

FIG. 11 is a chart showing a data structure 1100 associated with the information collected, in accordance with one embodiment. As shown, the intellectual property identifiers are correlated to various technology categories, competing patents, and competing activity. Of course, various information may be stored in relation to each of these pieces of information to further enhance reporting. Further, the data structure 1100 may be reconfigured to show the various information as a function of technology categories, competing patents, and competing activity.

Reporting on the Correlation Between the Intellectual Property and the Competing Activity (310)

One preferred method of organizing intelligence gathered from the foregoing sources is a technique referred to as "mapping." Mapping, in the present context, is a technique for correlating a company's patents with the patents and activities of other companies.

Mapping, if done properly, can provide vast insight into a patent portfolio, which in turn can be actively and strategically used to transform intellectual capital into patents that are well-positioned to effectively meet the defensive and offensive business objectives discussed earlier. For example, mapping can make the strengths and weaknesses of a patent portfolio immediately apparent. Three types of mapping will now be described, after which various techniques of utilizing such intelligence will be set forth.

Technology Mapping

Technology mapping refers to the process of organizing a patent portfolio via separation of the patents in that portfolio into multiple technology groups, thus giving insight into the strength of patent protection of a company in various technological areas. One easy way to conduct technology mapping is to classify patents in terms of the class assigned by a patent office. In order for technology mapping to be most effective, however, the technology groups should be chosen based on relevance to the business of the company and any competitors. Thus, it is best if the technology groups are manually selected. A company's product line and divisions are often the best places to begin identifying pertinent technological categories.

Once the technology groups have been selected, the patents in a patent portfolio may be categorized according to the most relevant technology group. Thus, the result of such technology mapping is an indication as to the number of patents in each of the technology groups. This information provides an immediate clue as to the strengths and weaknesses of a company's patent portfolio in terms of pertinent technological areas. Moreover, technology mapping can parse a large portfolio into a number of digestible portions, making it much more manageable.

Patent Mapping

Patent mapping provides a comparison of a company's patent portfolio with those of competitors. Patent mapping may take various forms. For example, each patent of a company's portfolio may be reviewed to identify patents referenced by a patent office examiner during prosecution, as well as other patents that reference the particular patent. This information is often referred to as forward and backward citing. Other types of queries may be used to locate related patents based on patent class, bibliographic information, etc. Again, publicly available databases are critical in gathering such patent intelligence.

Ideally, patent mapping involves not only issued patents, but also pending patent applications. While recently-filed patent applications are usually not available for competitor patent portfolios, it should be noted that patent applications are published under the Patent Cooperation Treaty (PCT)

and under recent amendments to United States patent law. Such publications may give at least a glimpse of a competitor's current technological focus.

Patent mapping often aids in identifying competitors with research and development which overlaps that of a company. Further, such patent mapping provides information with which patent value may be determined or evaluated. For example, if a particular patent has been referenced by a large number of patents in a short time period, such patent is likely a pioneering-type patent representing a base technology from which other competitors are expanding. To this end, the "crown jewel" patents may be ascertained using the present form of patent mapping.

As mentioned above, patent mapping may take various forms. An alternative or supplementary type of patent mapping is more company-driven, as opposed to patent-driven like the foregoing technique. When conducting a company-driven patent map, one must first select several companies of interest. Once the companies of interest are identified, the patents of these companies must be identified.

With these competing patents in hand, they may be sorted into the technology groups selected during the technology mapping. This type of patent mapping may thus be used to "size up" the competition while identifying particular strengths or vulnerabilities with respect to a particular competitor. Further, the present technique provides insight into the patents in a specified area of technology.

If the results of the patent mapping are stored and presented in an appropriate medium, an intelligence information base may be afforded where all of a company's patents may be accessed, along with the patents of key competitors. One caveat to note is the potential liability under any notice of such patents and associated willful infringement. This risk may be weighed against the foregoing benefits, and procedures may be concurrently established to minimize such risk.

License Mapping

License mapping is perhaps the most valuable intelligence that can be used to increase the value of a patent portfolio. This intelligence primarily focuses on two types of information, a company's patents and patent applications, and the activities of competitors. Competitive market intelligence is vital for license mapping.

One way to approach license mapping involves a patent-by-patent review of a portfolio, whereby the activities of competitors that correlate with the technology covered by each patent are identified. Of course, the best way to identify the technology covered by each patent is to review the claims. For reasons that will soon become apparent, the market intelligence gathered during the course of the present mapping need not and should not only be those competing activities that are deemed to be infringing the claims of issued patents, but also competing activities that prove to correlate with the claims of pending patent applications.

Similar to patent mapping, license mapping provides information with which a value of a patent may be determined. If a particular patent has a large number of instances of correlating competing activities, such patent is likely to represent significant licensing potential. Further, such patents may likely be useful in a defensive situation in any effort to secure a company's freedom of action.

Figure 12:
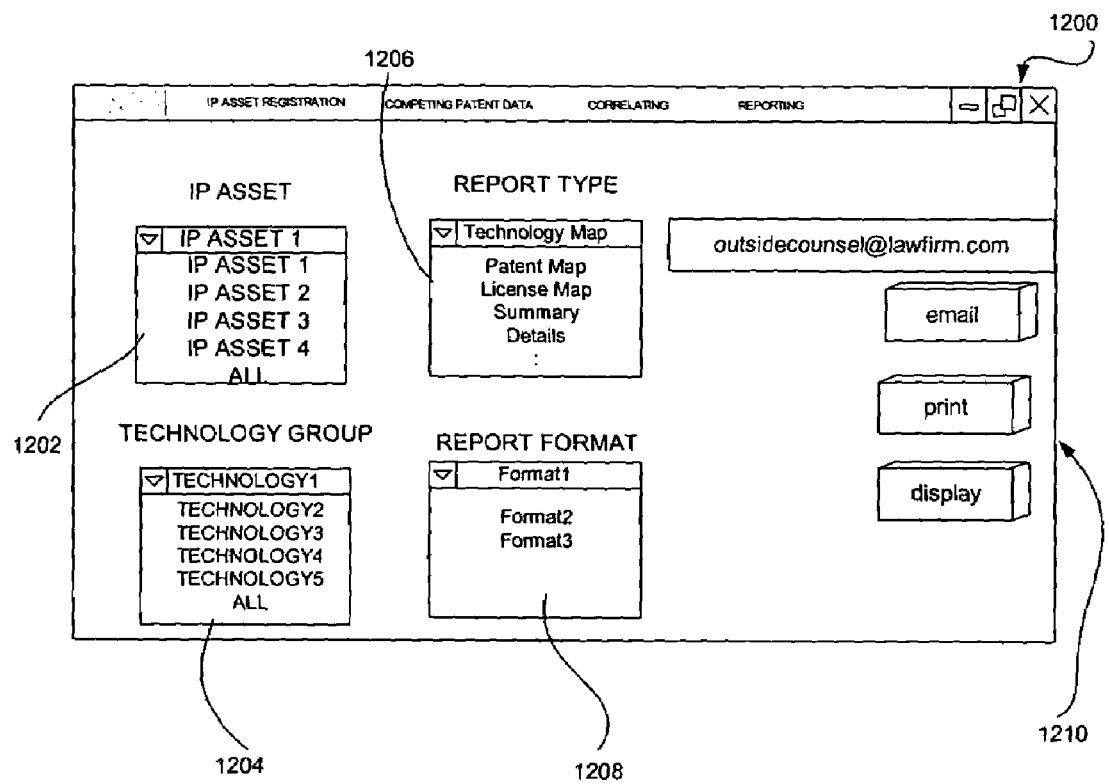
FIG. 12 illustrates an exemplary graphical user interface for defining a report utilizing collected competing activity documentation, in accordance with one embodiment.

FIG. 12 illustrates an exemplary graphical user interface 1200 for defining a report utilizing collected competing activity documentation, in accordance with one embodiment. While the current graphical user interface 1200 is designed for the purpose of defining a search, it should be noted that any other designs may be utilized per the desires of the user.

As shown, an intellectual property identifier pull-down window 1202 may be provided for selecting an existing intellectual property identifier, or all of the existing intellectual property identifiers. As shown, a technology category pull-down window 1204 may also be provided for selecting an existing technology category, or all existing technology categories.

As mentioned above, other designs of the graphical user interface 1200 can be used. For example, the identifiers and categories can be listed in scrollable windows rather than pull-down windows 1202, 1204. Thus, for example, the user can select particular items in the scrollable windows by holding down the CTRL key and selecting multiple items.

Once selected, a report type may be selected using a report type pull-down window 1206. Such report types may vary per the desires of the user. For example, such report types may include a technology map, a patent map, a license map, an inventor map, a mapping of the intellectual property firm that prepared any portion of the intellectual property documentation, or simply provide a summary or details pertaining to the selected intellectual property identifier and/or technology category. More information on such reports will be set forth hereinafter in greater detail.

As an option, a report format may be selected using a report format pull-down window 1208. Such format may include the use of different charts (i.e. pie chart, bar graph, etc.) or may organize the data in various ways. It should be understood that not only the format, but the reports themselves may be specifically configured per the desires of the user using the data of FIG. 11 in any desired manner.

Once selected and/or configured, the report may be printed, displayed, or emailed using the icons 1210 shown in FIG. 12. Other options (not shown) include saving the report to memory, etc.

Figure 13:
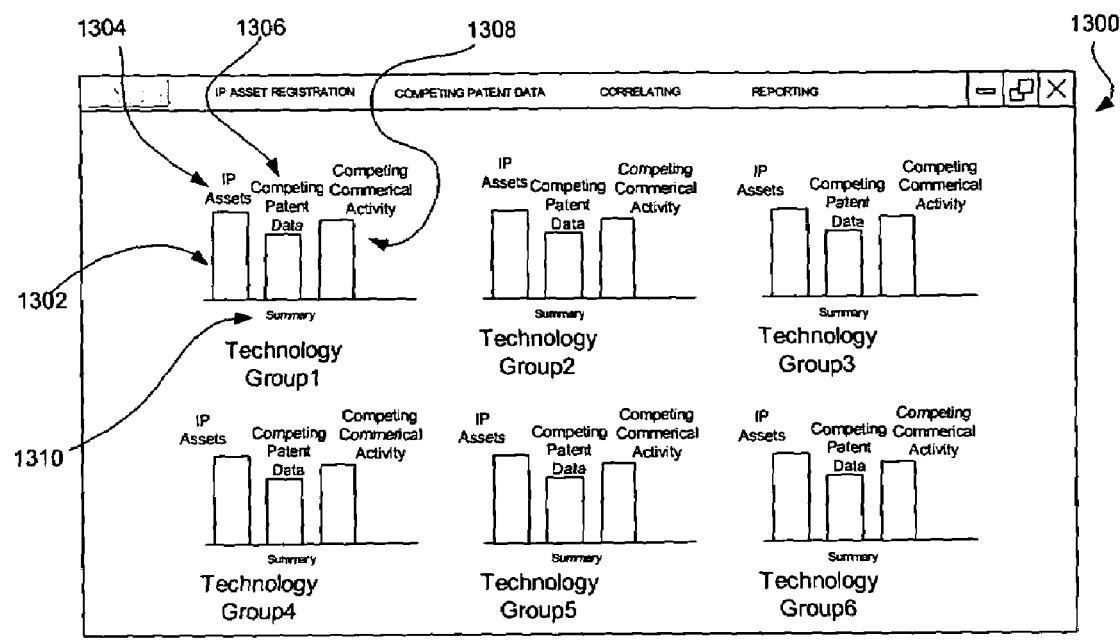
FIG. 13 illustrates an exemplary technology map report, in accordance with one embodiment.

FIG. 13 illustrates an exemplary technology map report 1300, in accordance with one embodiment. Such technology map report 1300 may be outputted in response to the selection of the technology map report using the report type pull-down window 1206 of FIG. 12, and selecting all of the categories using the technology category pull-down window 1204. Of course, fewer technologies may be selected for display per the desires of the user.

As shown, each technology group is represented with a plurality of bar graphs 1302 including a first bar 1304 for representing a number of intellectual identifiers associated with the particular technology group. Also included is a second bar 1306 indicative of a number of competing patents in the particular technology group. Still yet, another third bar 1308 is used to represent relatively the number of instances of competing activity in the particular technology group. Note that the graphs may be in another form, such as pie graphs, line graphs, etc. For reasons that will soon become apparent, a summary icon 1310 may also be provided.

As mentioned earlier, the various reports may be printed, emailed, and/or displayed. It should be noted that the electronic versions of the report (those that are displayed utilizing a computer) may include interactive features to further analyze the data by drilling down into selected areas. More information will now be set forth regarding a method with which this can be accomplished.

Figure 13A:
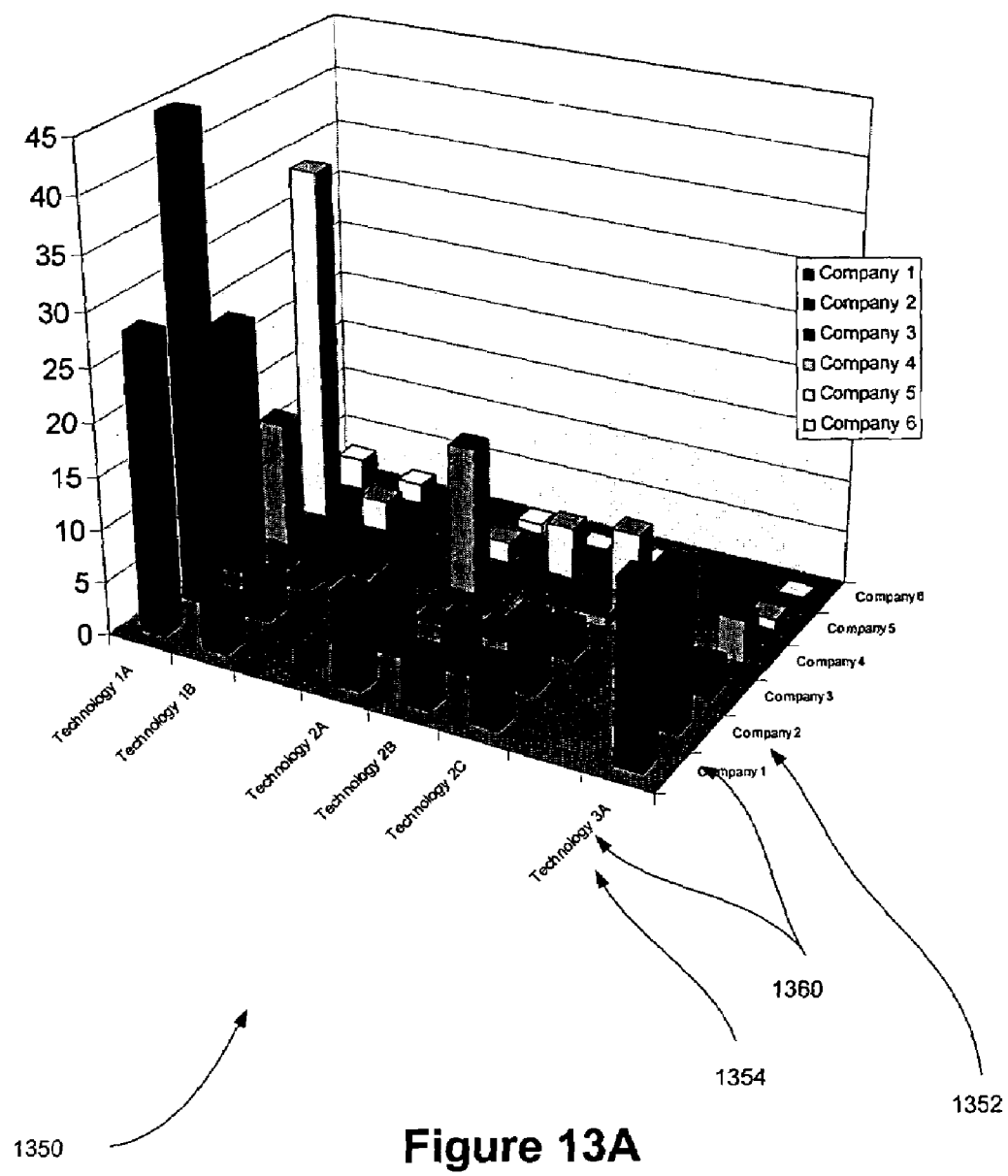

FIG. 13A illustrates another exemplary technology map report 1350, in accordance with a 3-D embodiment. Such technology map report 1350 may be outputted in response to the selection of the technology map report using the report type pull-down window 1206 of FIG. 12, and selecting all of the categories using the technology category pull-down window 1204. As an option, the technologies may optionally be arranged in subsets, as shown. The companies may be selected in a similar manner, or in any context desired.

As shown, a plurality of rows of bar graphs 1352 are included, which are each row of associated with a particular company. Also, included is a plurality of columns of the bar graphs 1352, which are each column is associated with a particular technology group. Of course, the foregoing columns and rows may be transposed. Note that the graphs may be in another form. Summary icons 1360 may also be provided.

As mentioned earlier, the various reports may be printed, emailed, and/or displayed. It should be noted that the electronic versions of the report (those that are displayed utilizing a computer) may include interactive features to further analyze the data by drilling down into selected areas. More information will now be set forth regarding a method with which this can be accomplished.

It should be noted that, in the context of the user interface 1350 of FIG. 13A, the selection of one of the "bars," summary icons 1360, or any other associated icon may first generate a 2-D graph corresponding with a horizontal or vertical slice of the 3-D graph of user interface 1350.

For example, upon the selection of Company2, a 2-D graph showing the IP assets of two companies [i.e. main Company1 (default) and Company2] may be shown side-by-side as set forth in the interface 1380 of FIG. 13B. In other words, the selection of one of the companies may produce a 2-D graph illustrating a comparison of two companies (the one selected and a default "client" company) in each of the technology groups, where the selection of one of the "bars" or corresponding icon may indicate a list of patents in such group, and further where the selection of one of the patents may produce specific information regarding such patent; in a manner similar to that will soon be set forth. Thus, such interface 1380 of FIG. 13B may then be "drilled-down" in a manner similar to that of IP Assets and Competing Patent Data graphics of FIG. 13, as will soon become apparent.

In a similar manner, it should be noted that the selection of a particular technology group may produce a 2-D graph illustrating a comparison of each of the companies in the specific technology group, where the selection of a "bar" or related icon may indicate a list of patents owned by such company in the particular technology group, and further where the selection of one of the patents may produce specific information regarding such patent; in a manner similar to that will soon be set forth.

Of course, the interface 1380 of FIG. 13B may be skipped by simply clicking the "bars" or related icon of the report 1350 of FIG. 13A.

Figure 13C:
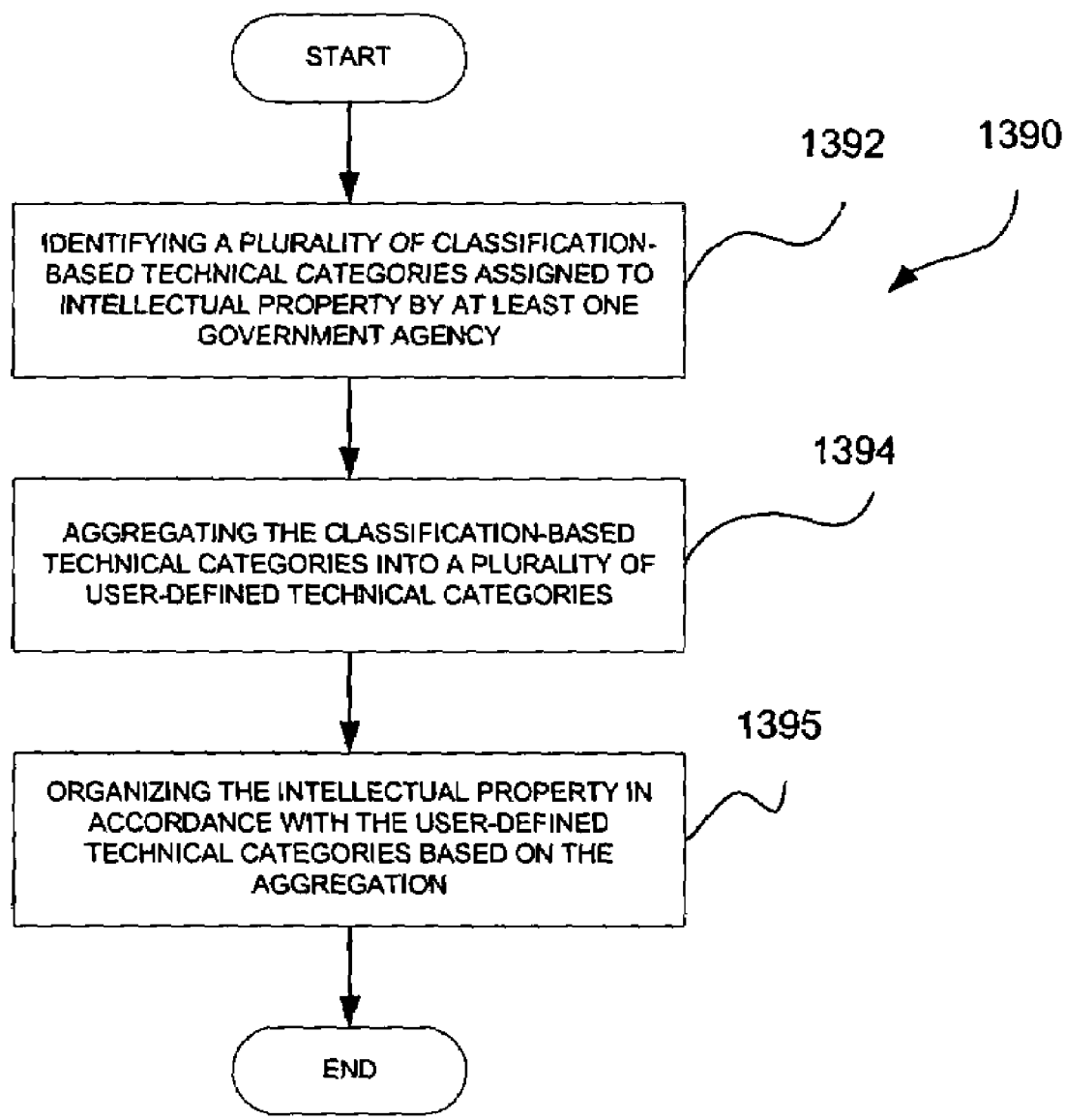
FIG. 13C illustrates a method for categorizing intellectual property.

FIG. 13C illustrates a method 1390 for categorizing intellectual property, in accordance with one embodiment. As an option, the intellectual property categorization technique disclosed herein may be integrated with the other techniques disclosed herein. In the alternative, the present technique may be implemented in any desired context.

In operation 1392, a plurality of classification-based technical categories assigned to intellectual property by at least one government agency is identified. The purpose of this identification will soon be set forth. As an option, the identification may be a manual and/or automatic process. In the context of the present description, the classification-based technical categories may include the 3 and/or 6 digit classification assigned by the United States Patent Office. For example, at the time of the filing of this application, the technical classification "345" relates to "Computer graphics processing, operator interface processing, and selective visual display systems" and "345/423" refers to a subset technical category related to "Computer graphics processing; Three-dimension; Tessellation." Still yet, the international classification system (IPC) may be used. As an option, the primary classification may be used if there are multiple classifications listed.

Next, the classification-based technical categories are aggregated into a plurality of user-defined technical categories. Note operation 1394. In the context of the present description, the user-defined technical categories may refer to any technical categories defined by a user. For example, the user-defined technical categories may be aligned to a plurality of business units or product lines of a particular corporate entity, or in any other desired categories that may be useful to the user. Moreover, the user-defined technical categories may have a user-defined textual descriptor for easy identification.

This aggregation may be a manual and/or automatic process. In one embodiment, the classification-based technical categories may be associated or assigned to one or more user-defined technical categories. This may be accomplished by reviewing the textual descriptions of the classification-based technical categories and/or various patents (and possibly claims, title, etc. thereof) in such classification-based technical categories to determine to which of the user-defined technical categories they are relevant. In a manual embodiment, the user may associate the classification-based technical categories with the user-defined technical categories by first selecting a user-defined technical category using any interface mechanism, and then entering the various classification-based technical categories (designated by their associated code) into a related field. As an option, wildcards may be used to indicate an entire class (including all subclasses). To this end, a table (or any other similar data structure) such as the following Table 1 is provided.

TABLE 1

| User-Defined Technical Category_1 | 305/*, 704/234, 677/267 |
| User-Defined Technical Category_2 | 315/*, 714/244, 678* |
| User-Defined Technical Category_3 | 325/23, 724/264, 679/675 |
| User-Defined Technical Category_4 | 335/*, 744/274, 680* |

Still yet, the user may simply categorize patents and/or patent applications specific to one corporate entity (the user may be in-house counsel for such corporate entity) in various user-defined technical categories. As an option, this may be accomplished via the registration and other related techniques disclosed herein.

An automatic process may then take place, whereby the classification-based technical categories are collected from publicly available patents and/or patent applications (those that are published), and the above data structure may be generated automatically. For example, a user may associate patent_1 with User-Defined Technical Category_1. The classification-based technical categories of patent_1 may then be associated with User-Defined Technical Category_1. It should be noted that the table may be constantly updated based on additional user input, etc.

If the docketing system is used in the context of the aforementioned architecture wherein a docketing system is interfaced with a comprehensive patent database, non-published patent applications can be categorized. Moreover, preliminary classifications may be employed and gathered from a password-protected, secure governmental on-line database [i.e. USPTO patent application information retrieval (PAIR) system, etc.].

The intellectual property may then be organized in accordance with the user-defined technical categories based on the aggregation, as indicated in operation 1395. Further, intellectual property not necessarily subject or associated with the initial aggregation process may thus be included in the organization process.

While such organization may take any form, one form may include the various mappings disclosed herein. For example, given the aforementioned data structure, a mapping such as that shown in FIG. 13A may be automatically generated with technical categories that are much more relevant to the business of the corporate entity. In the specific context of the mapping of FIG. 13A, a database search for all patents owned by a plurality of corporate entities may be conducted. Thereafter, the classification-based technical categories of such patents may be identified (by simply reading the appropriate field), and each patent may be organized per the user-defined technical categories, based on a data structure like that of Table 1.

As an option, additional confidential information (not published) from a docketing system may be incorporated in this mapping to provide more insight than would otherwise be possible based on available public data.

Thus, by manually and/or automatically aggregating the classification-based technical categories with a limited number of intellectual property (i.e. intellectual property associated with a corporation being managed by a user of the present embodiment), a more meaningful "technical map" or any other of the reports disclosed herein may be generated.

In the case where a full comparison is being conducted between 2 or more corporate entities and a database search indicates that certain patents include classification-based technical categories that are not included in the aggregation, secondary classifications may be relied upon or a user may be notified that additional aggregation is necessary. As a further option, some or all of the above aggregation may be based on textual strings associated with the classification-based technical categories or portions of the patent included in such categories. Still yet, a simple "other" user-defined category may be used to reflect such patents.

Figure 14:
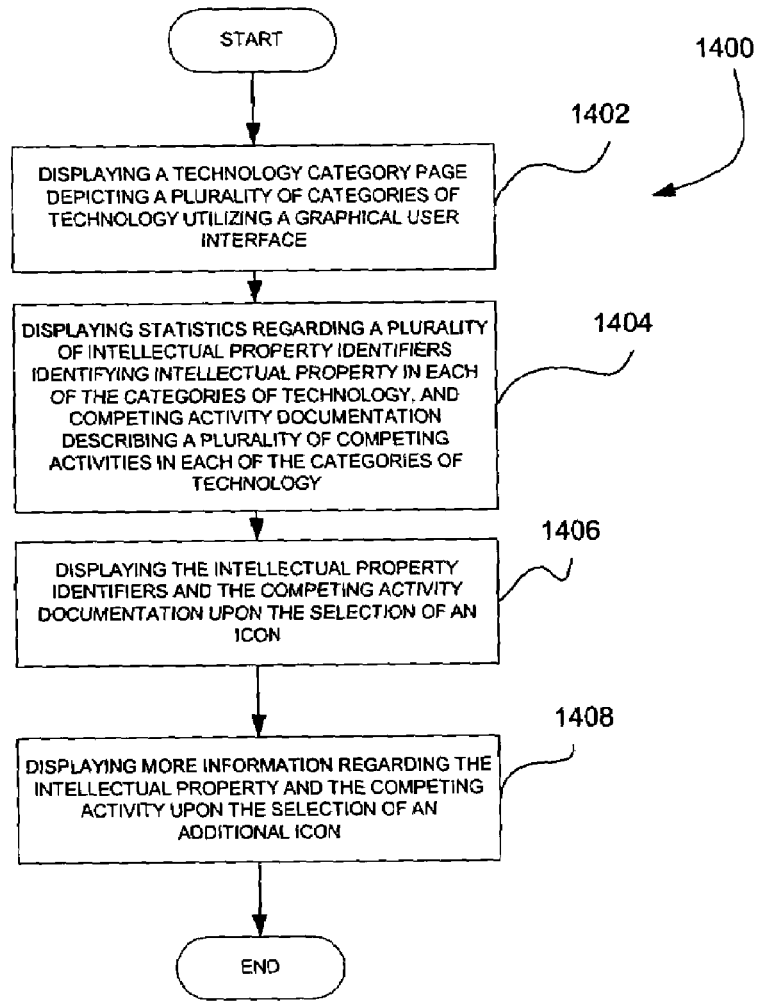
FIG. 14 illustrates method for providing a graphical user interface such as that of FIG. 13 which is equipped for reporting on strategic intellectual property management.

FIG. 14 illustrates a method 1400 for providing a graphical user interface such as that of FIG. 13 (or even that of FIGS. 13A–B) which is equipped for reporting on strategic intellectual property management. In operation 1402 a technology category page is displayed depicting a plurality of categories of technology utilizing a graphical user interface.

As set forth in the exemplary graphical user interface 1300 of FIG. 13, the technology category page includes statistics regarding a plurality of intellectual property identifiers identifying intellectual property in each of the categories of technology. Also included is competing activity documentation describing a plurality of competing activities in each of the categories of technology. Note operation 1404. Of course, as mentioned before, competing patent data may also be included.

In operation 1406, a user may be allowed to select a summary icon on the graphical user interface 1300. In use, such icon may act as a link to another page which sets forth additional information.

Figure 15:
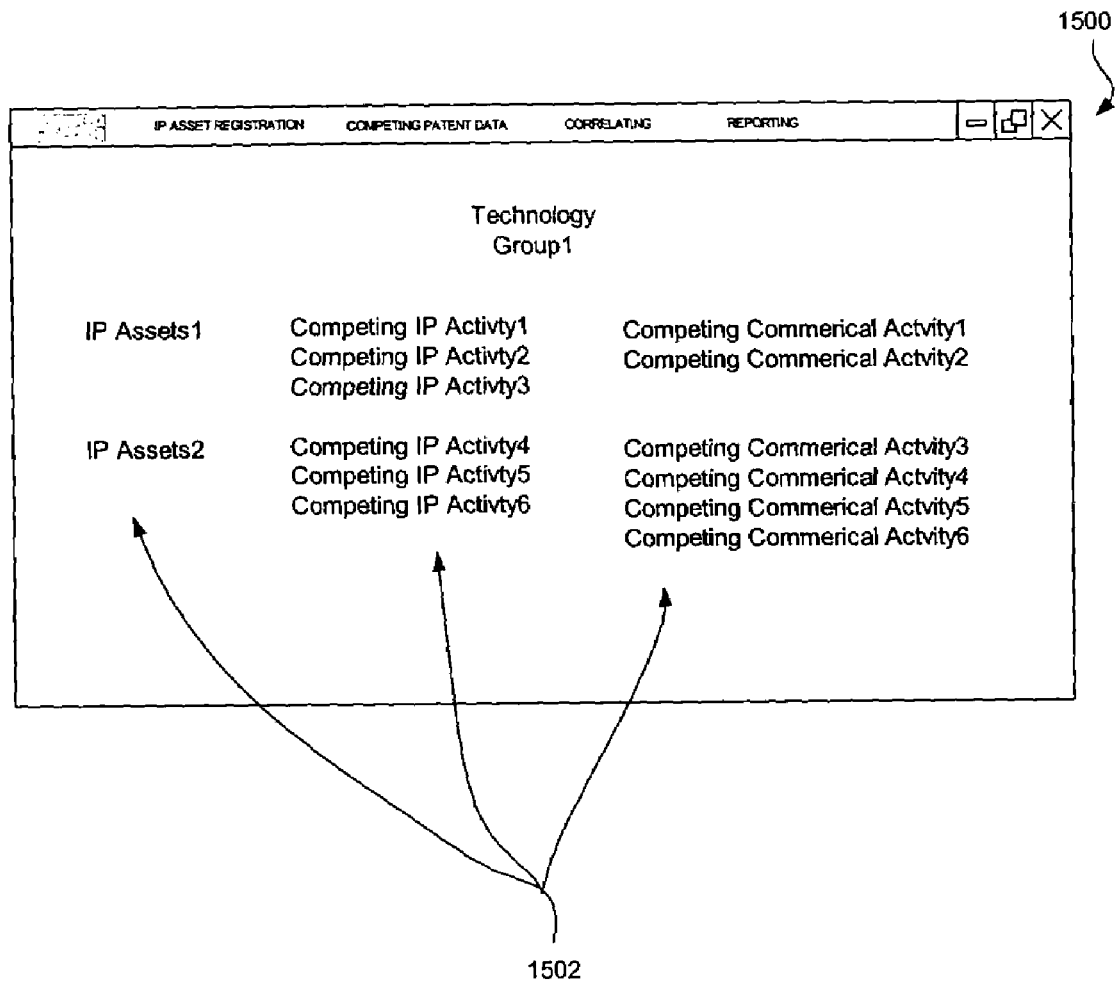
FIG. 15 illustrates an exemplary summary report, in accordance with one embodiment.

FIG. 15 illustrates an exemplary summary report 1500, in accordance with one embodiment. Such report 1500 may be displayed in response to the selection of the summary icon 1310 of one of the technology categories shown in the interface 1300 of FIG. 13. In the alternative, such page may be generated in utilizing the report definition interface 1200 by selecting a particular technology category via pull-down window 1204, selecting all of the intellectual property identifiers via pull-down window 1202, and selecting a summary format type. Of course, the summary report 1500 may be generated in any desired manner.

As shown, the summary report 1500 lists each of the intellectual property identifiers, each competing patent, and each instance of competing activity associated with the appropriate technology category. For reasons that will soon become apparent, each item in the lists 1502 may include a link to an additional page with more information.

In an alternate embodiment, an intellectual property identifier icon, competing patent icon, or a competing activity documentation icon may be selected separately. In such embodiment, the icons may include the bars 1304–8. Upon the selection of one such icons, only the intellectual property identifiers, competing patents, or competing activity documentation related to the particular technology category may be displayed, the intellectual property identifiers may be displayed. Note operation 1406.

With continuing reference to FIG. 14, more information may be displayed regarding the intellectual property, the competing activity, and the competing patents in response to a user request in operation 1408.

Figure 16:
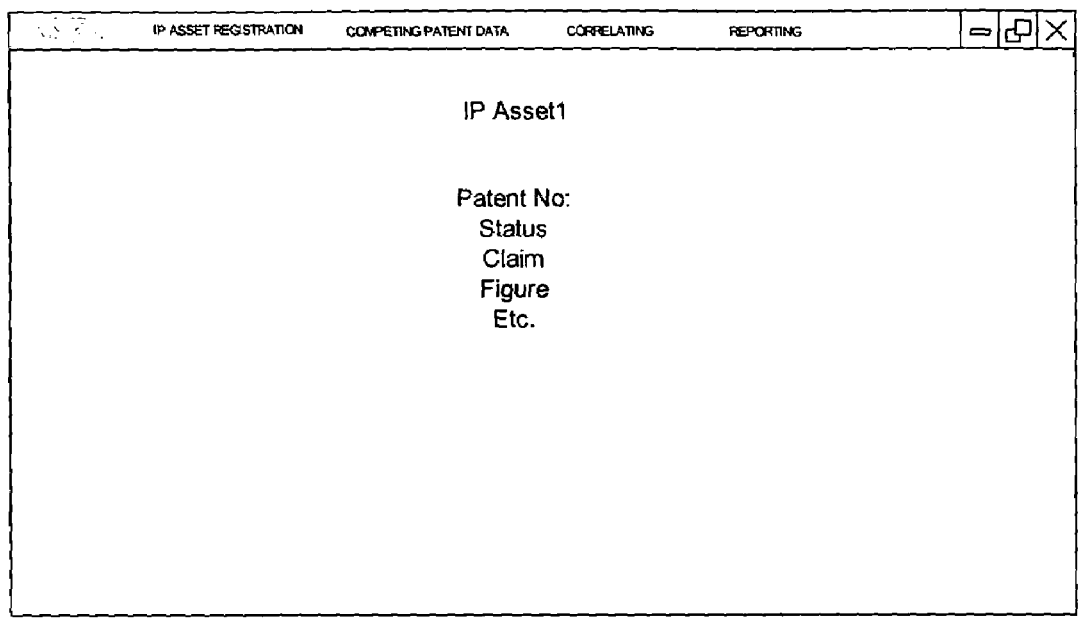
FIG. 16 illustrates an exemplary intellectual property details report, in accordance with one embodiment.

In particular, upon a user selecting one of the intellectual property identifiers in the lists 1502, more information relating to such intellectual property may be presented. FIG. 16 illustrates an exemplary intellectual property details report 1600, in accordance with one embodiment. As shown, a patent number, status, exemplary claim and figure, etc. may be provided in such report. It should be noted that such intellectual property details report 1600 may also be generated directly utilizing the report definition interface 1200 by selecting a particular intellectual property identifiers via pull-down window 1202, and selecting a details format type.

Of course, the details report 1600 may be generated in any desired manner.

Figure 17:
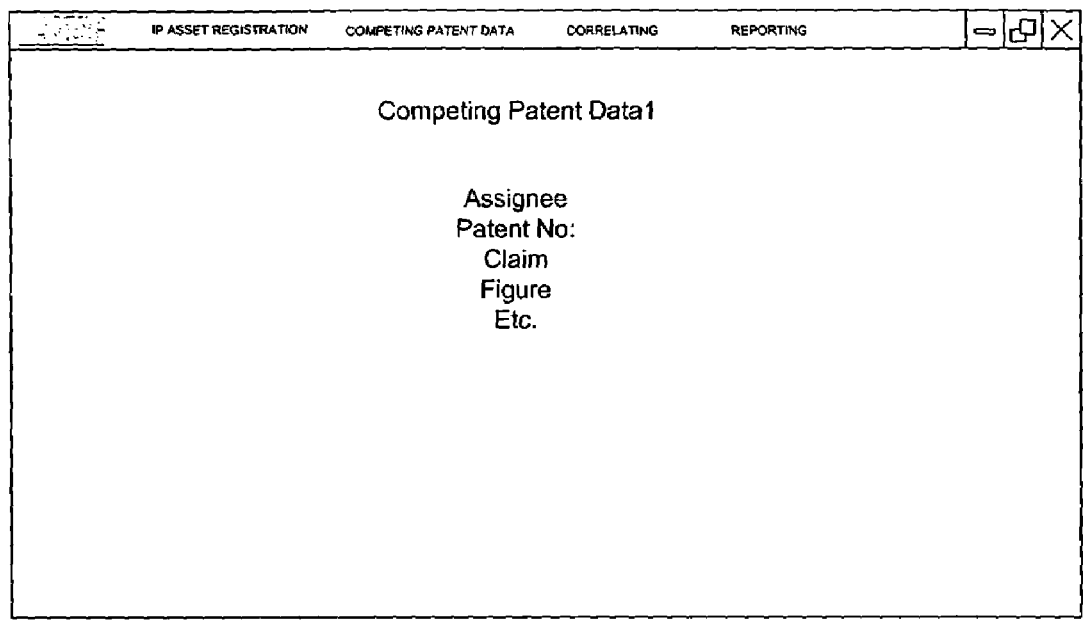
FIG. 17 illustrates an exemplary competing patent details report, in accordance with one embodiment.

Still yet, upon a user selecting one of the competing patents in the lists 1502, an assignee, patent number, status, exemplary claim and figure, etc. may be provided. FIG. 17 illustrates an exemplary competing patent details report 1700, in accordance with one embodiment.

Figure 18:
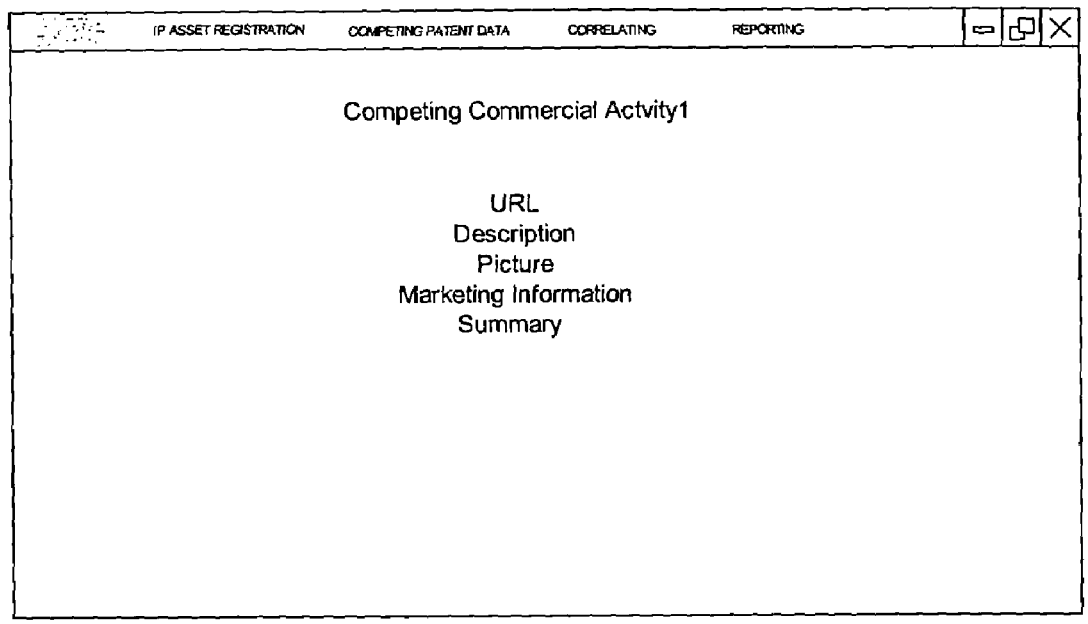
FIG. 18 illustrates an exemplary competing activity details report, in accordance with one embodiment.

The user may also select one of the instances of competing activity from the lists 1502 of FIG. 15. In response thereto, more information on such selected competing activity may be provided. FIG. 18 illustrates an exemplary competing activity details report 1800, in accordance with one embodiment. As shown, a URL/pointer, description, picture, marketing information and/or textual summary may be provided which were earlier archived. As an option, the URL/pointer may be linked directly from the report 1800.

Figure 19:
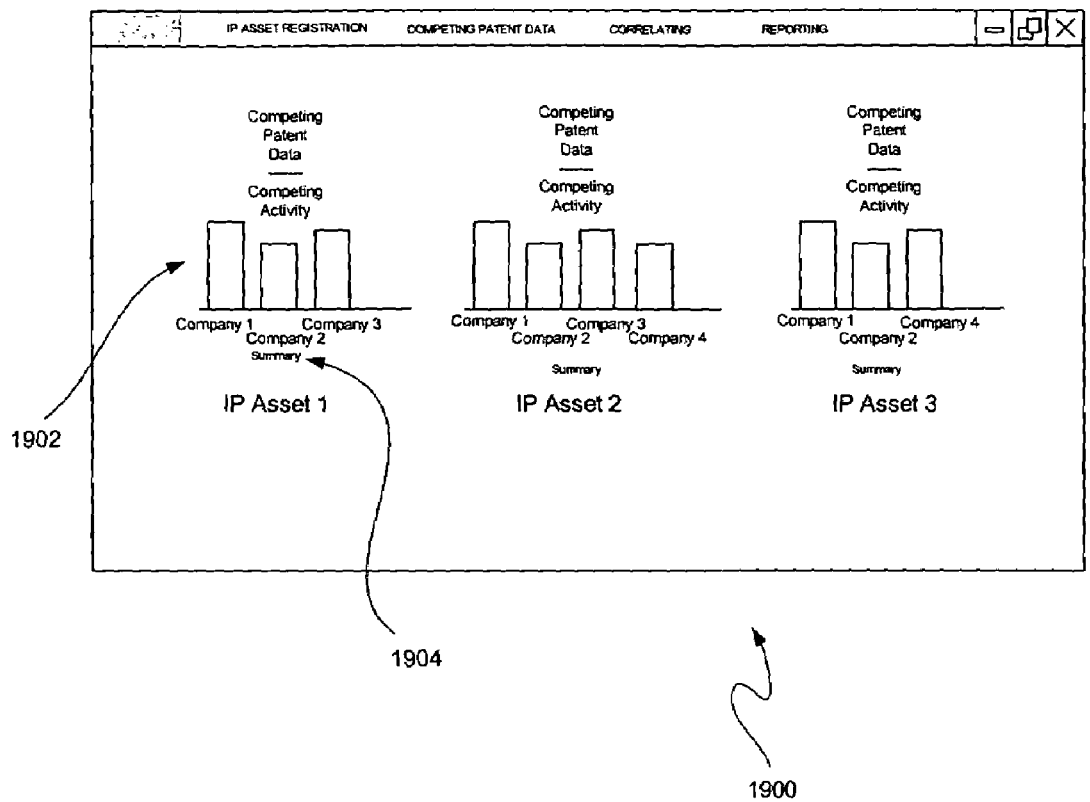
FIG. 19 illustrates an exemplary patent/license map report, in accordance with one embodiment.

FIG. 19 illustrates an exemplary patent/license map report 1900, in accordance with one embodiment. Such patent/license map report 1900 may be outputted in response to the selection of the patent or license map report using the report type pull-down window 1206 of FIG. 12, and selecting all of the intellectual property identifiers using the intellectual property identifier pull-down window 1202. Of course, fewer intellectual property identifiers may be selected per the desires of the user.

As shown, each intellectual property identifier is represented with a plurality of bar graphs 1902 including a plurality of bars each representative of a particular company that may be considered a competitor to the user. Further, a size of each bar may represent a number of competing activities or competing patents associated with the particular intellectual property identifier. In the case of the selection of the patent map report using the report type pull-down window 1206, such size of each bar may represent a number of competing patents. In the case of the selection of the license map report using the report type pull-down window 1206, such size of each bar may represent a number competing activities. Of course, both may be displayed simultaneously if desired by the user, and the size of the interfaces permits the same. Similar to the report 1300 of FIG. 13, a plurality of summary icons 1904 may be included.

Figure 20:
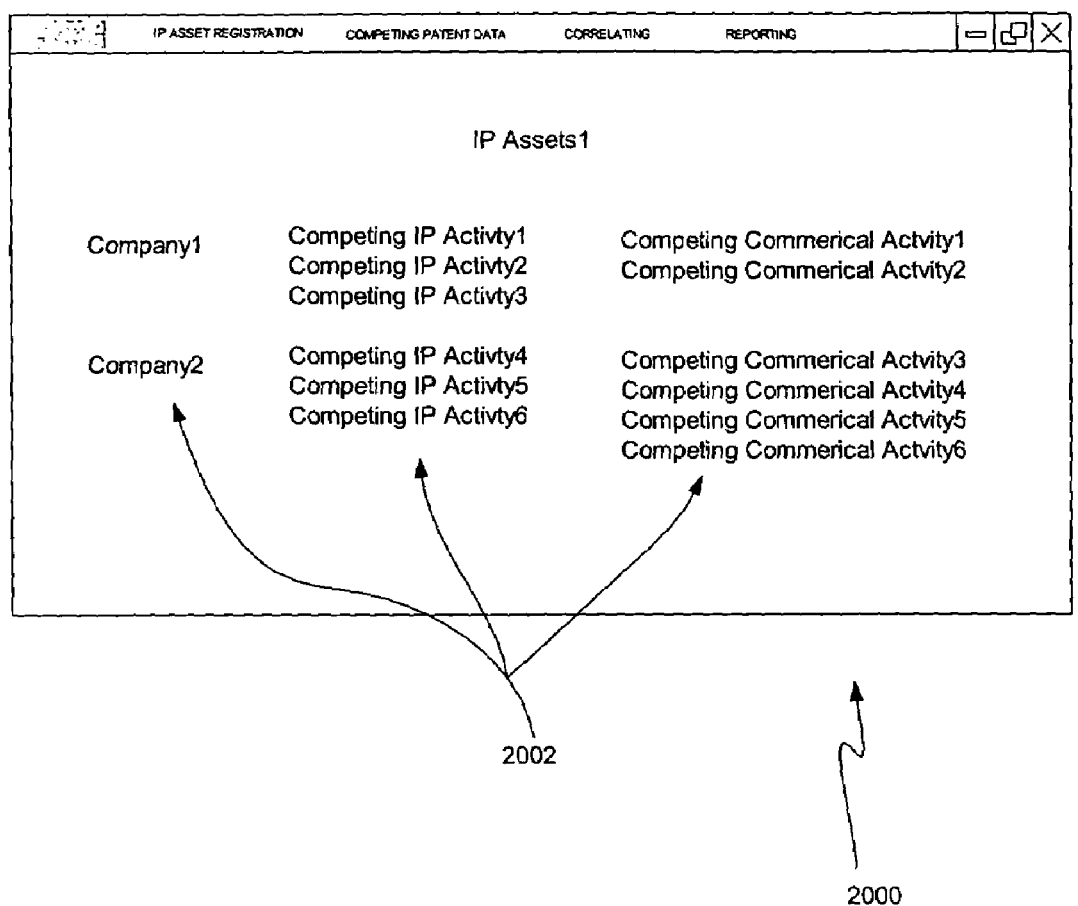
FIG. 20 illustrates an exemplary summary report, in accordance with one embodiment.

FIG. 20 illustrates an exemplary summary report 2000, in accordance with one embodiment. Such report 2000 may be displayed in response to the selection of the summary icon 1904 of one of the technology categories shown in the interface 1900 of FIG. 19. In the alternative, such page may be generated in utilizing the report definition interface 1200 by selecting one of the intellectual property identifiers via pull-down window 1202, and selecting a summary format type. Of course, the summary report 2000 may be generated in any desired manner.

As shown, the summary report 2000 lists each of competing company along with the corresponding competing patents, and competing activity thereof. For similar reasons as before, each item in the lists 2000 may include a link to an additional page with more information.

As one option, selected details displayed on the details report may be retrieved from the Electronic Business Center of the United States Patent and Trademark Office. Such details can include filing date, current status, file history in the Office, and/or any other information retrievable from the Electronic Business Center.

Figure 21:
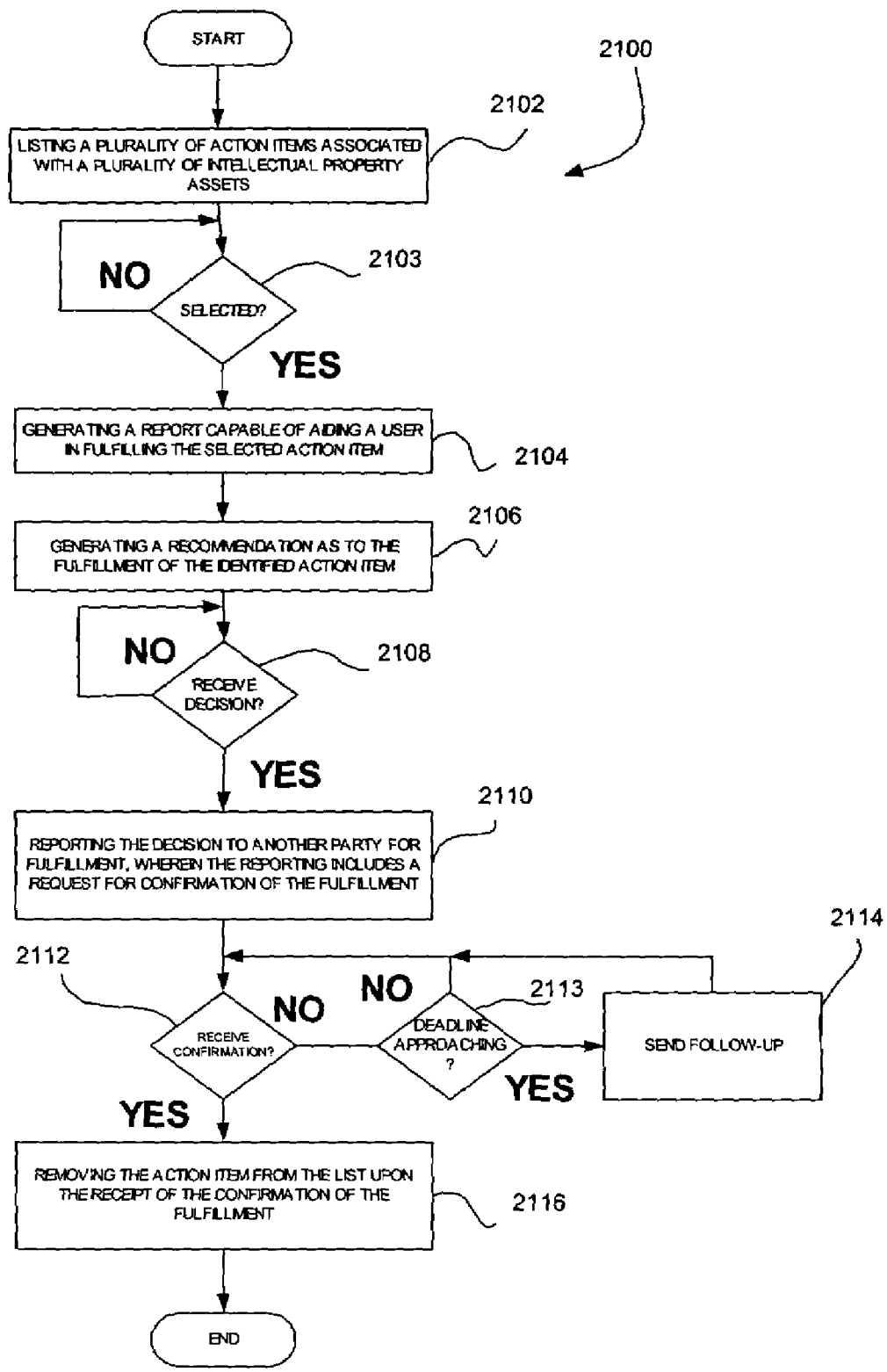
FIG. 21 illustrates a method for strategic intellectual property management utilizing a computer-implemented system, in accordance with one embodiment.

FIG. 21 illustrates a method 2100 for strategic intellectual property management utilizing a computer-implemented system, in accordance with one embodiment. As an option, the present method 2100 may be implemented in the context of the foregoing architecture and techniques. Of course, however, the present method 2100 may be implemented in any desired context.

Initially, a plurality of action items associated with a plurality of intellectual property assets are listed or otherwise displayed in any desired manner. Note operation 2102. It should be noted that the action items may be generated utilizing a docketing database, like the one mentioned above. For example, the action items may include taking an invention disclosure, filing a patent application, filing an information disclosure statement for a patent application, foreign filing a patent application, responding to an office action for a patent application, paying an issue fee for a patent application, filing a continuation patent application for a previous patent application, and/or paying a maintenance fee.

Figure 22:
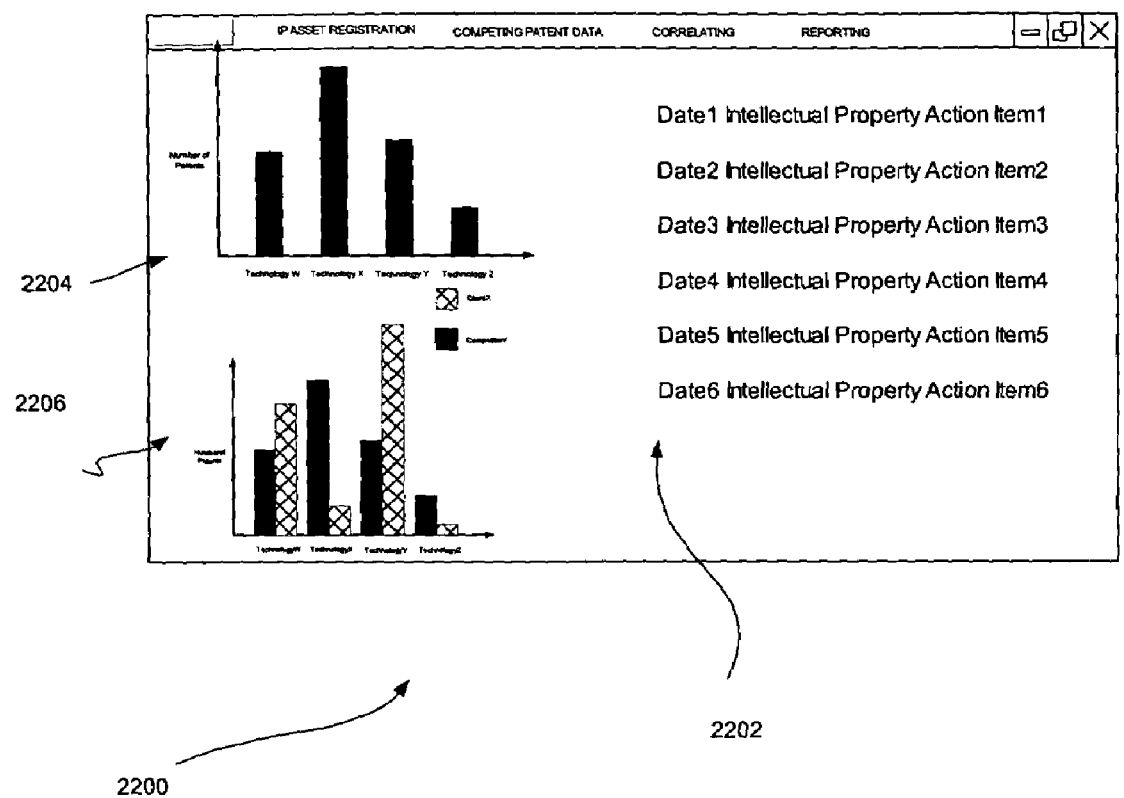
FIG. 22 illustrates a sample graphical user interface for listing a plurality of upcoming action items.

While this may be accomplished in any desired manner, more information regarding one exemplary way of displaying such action items will be set forth during the description of FIG. 22.

Next, in decision 2103, it is determined whether any of the action items has been selected. This may be accomplished in any desired manner (i.e. a mouse click, etc.). Once selected, a report capable of aiding a user in fulfilling the selected action item is displayed, as indicated in operation 2104. While this may be accomplished in any desired manner, more information regarding one exemplary way of such reporting will be set forth during the description of FIG. 22.

Moreover, a recommendation is generated as to the fulfillment of the identified action item. Such recommendation may be based on any desired combination of factors. For example, it may be based on a technology mapping, citation mapping, patent mapping, license mapping, a rating, and/or any other type of business logic. As mentioned earlier, a database of such ratings, business logic, as well as other information may be made available for such purpose. Still yet, the recommendation may use Boolean logic or even user-configured logic to generate the appropriate recommendation. For example, a user may indicate that any patent application with a rating lower than X "AND" which is in a technology group where, quantitatively, a company already has more foreign patent applications than a list of key competitors (as determined by a real-time search in a database of foreign patents) will render a recommendation of "NOT FOREIGN FILING." More information will now be set forth regarding the manner in which the rating may be determined. Of course, the rating may change throughout the patent lifecycle based on various criterion such as the following.

Rating Patents

On a day-to-day basis, corporate patent managers are called upon to make the decisions necessary to build and maintain a premiere patent portfolio that effectively secures the freedom of action of the corporation, provides licensing opportunities, enhances its value proposition, and protects its technological "crown jewels." In lean economic times characterized by tighter budget constraints, these patent managers are charged with the difficult task of accomplishing these goals in the most cost-effective manner possible.

Thus, it is important that each cost-incurring decision during the patent life-cycle be made intelligently. Examples of such decisions include: whether to file a patent application on an invention, how many patent applications to file on certain technology, whether to file for international protection, whether to continue and/or appeal prosecution of a patent application, whether to pay a maintenance fee on an issued patent, etc.

As indicated in the figure, the value of the subject technology and any resulting patent should be assessed at each of the foregoing junctures to afford the best patent portfolio under reasonable financial constraints. To accomplish this assessment, the following criteria should be applied.

Whether Claims Cover a Company's or Competitor's Product

Quite often, corporate patent managers are inundated with "wouldn't it be great if" inventions submission. While these submissions should never be simply discarded, special scrutiny should be applied, since covering a company's or competitor's product lies at the root of the defensive and offensive value of the company's patent portfolio.

One should be aware that, when initially selecting inventions for patenting, the existence of a competitor's product may likely constitute prior art. On the other hand, 2–3 years into the prosecution of a patent application, the identification of a competitor product may govern the amount of resources (i.e. payment of a maintenance fee, filing of a continuation, etc.) that is expended. Various competitive intelligence techniques may also be used to bring some of these competitive products to light.

Whether Claims Cover Something that would Influence the Buying Decisions of Consumers This criterion is designed to reflect the likelihood of inclusion of features in competitive products. It contemplates whether claims will likely cover a competitive product in the future by begging the difficult question, "would this feature be something that would give a company product a significant competitive edge." By addressing this question, the present criterion causes patent expenditures to focus on product features that matter to the consumer.

Whether Claims Cover Something that is Visible

If a company can not readily verify whether a patent is infringed (i.e., it is hidden in code, in a semiconductor fab, etc.), the resultant value is diminished since it can not be effectively asserted until after expensive reverse engineering, discovery, etc. While these patents may indeed protect important technology, a patent portfolio replete with such patents is more difficult to use.

What is the Potential Breadth of the Claims

Some companies rely on their inventors, as experts in their field, to answer the question: "What is the prior art and how broad will the resultant patent coverage likely be?" While this may be an optimal strategy for corporations that are involved in fast-moving technologies or that are worried about being put on "notice" by looking at patents; much can be gained by a prior art search. Since thousands of dollars are traditionally expended to file, prosecute and maintain a patent application, it often makes sense to conduct a search that may help the corporate patent manager make an intelligent expenditure Whether a Company Already has Claims in a Particular Technical Field or Related Technology Often, a corporate patent manager responsible for a portfolio in excess of 1000 patents has a hard time "weeding out" inventions that are duplicative for the portfolio. It is often hard to determine if claims are the first in a technical field for a company, or if they only supplement pre-existing patent coverage. It is obviously good to spread out patent protection among product lines and over business units. In the context of a battlefield analogy, sometimes it is better to spread a large number of deadly medium-sized mines about a technical field (i.e., the battlefield), in contrast with creating a colossal mine (i.e., a large group of applications) in each of a few areas. Of course, depending on the circumstances, however, it may be appropriate to file many applications in a specific important area. Patent mapping may often be useful in determining the distribution of patent filings among different technological arts[1].

Is the Technology the Subject of a Partnership and/or Alliance, or Being Jointly-Developed While most agreements and alliances often begin with the best intentions, it is often ideal to protect and maintain a corporation's patent rights in case they must be leveraged in a situation where a deal goes sour or the business environment changes. Therefore, patenting technology developed in conjunction with an agreement and/or alliance is a must.

What is the Value of the Market of a Particular Technology, and What Market Share Does a Corporation or Competitor Own In a cross-licensing and/or settlement situation where companies are comparing the value of patents as "trading chips," the reasonable royalty percentage of the associated market/market share often affects negotiations and should be considered during the procurement of patents. Thus, it may be less important to cover a product that a company or competitor is giving away for free, in favor of protecting technology relevant to a market worth millions.

What is the Technology Life-Cycle

If the technology is likely to "come and go" in less than 3 years, it is possible the patent will have little worth after issuance. With the average patent prosecution timeframe spanning 2–3 years after the time of filing, short-lived technologies may best be protected by other means, i.e. trade secrets, copyrights, etc.

Where is the Technology Marketable

This criterion comes into play when deciding the jurisdictions in which to pursue patent protection. While this decision can be cost-effectively delayed via the PCT process, this decision is important, as filing and maintaining a single patent world-wide can cost in excess of $1 million dollars.

Has the Technology Been Disclosed Prior to the Filing Date of the Related Patent Application This is an obvious, often easy-to-determine "show-stopper." This question comes into play when deciding whether patent protection is available in international "absolute novelty" jurisdictions, and whether a U.S. statutory bar exists. Often an invention evaluation starts by applying this fundamental criterion.

Would the Technology Be Easily Designed Around

If the technology itself is open to a vast number of equally-effective alternatives, patent protection on one particular design may be less valuable. To avoid infringement, a competitor need merely choose an equally viable, non-infringing alternative.

CONCLUSION

By applying the foregoing criteria to patents/applications when making patent life-cycle decisions, a company is capable of building and maintaining a premiere patent portfolio under reasonable budget constraints Next, in decision 2108, it is determined where a decision as to the fulfillment of the identified action item has been received from the user. Of course, the user may base such decision on the report and the recommendation, which was generated automatically, on-the-fly using the latest information from the integrated databases (i.e. docketing, competitive patent database, etc.

Once received, the decision is reported to another party (i.e. outside counsel, junior attorney, etc.) for fulfillment. This, of course, may be accomplished in any desired manner. For example, an automatically generated e-mail may be sent. While this may be accomplished in any desired manner, more information regarding one exemplary e-mail will be set forth during the description of FIG. 24.

As an option, the reporting may include a request for confirmation of the fulfillment. Thus, upon receipt of a confirmation (see decision 2112) such action item may be removed from the list in operation 2116. If, however, a confirmation is not received just prior to the deadline (i.e. any desired threshold time period), as determined decision 2113, a follow-up report may be sent in operation 2114.

FIG. 22 illustrates a sample graphical user interface 2200 for listing a plurality of upcoming action items 2202. As an option, such graphical user interface 2200 may be used in the context of operation 2102 of FIG. 21. Of course, however, such interface 2200 may be used in any desired context.

In one embodiment, the action items may be listed in chronological manner. An associated deadline date may even be displayed. It should be noted that the graphical user interface 2200 may serve as a "central" management interface. In such case, a plurality of general statistical data may be included on such interface 2200. For example, a general "high-level" patent map 2206 or technology map 2204 may be included, as shown, or in any desired manner. Such patent map 2206 or technology map 2204 may include all of the patents in all of the technology groups associated with a company.

Figure 23:
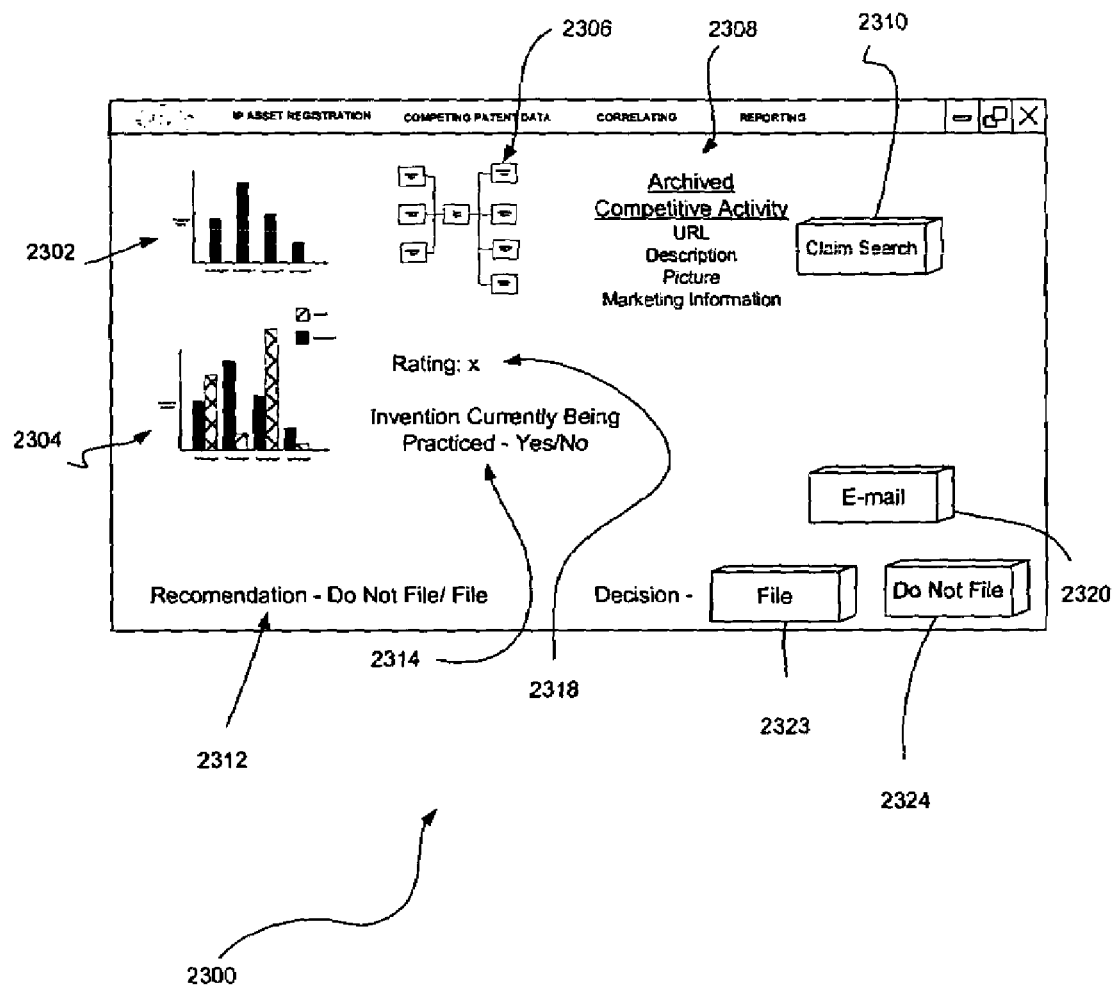
FIG. 23 illustrates a sample graphical user interface for reporting information relative to an upcoming action items.

FIG. 23 illustrates a sample graphical user interface 2300 for reporting information relative to an upcoming action items. As an option, such graphical user interface 2300 may be used in the context of operation 2102 of FIG. 21. Of course, however, such interface 2104 may be used in any desired context.

As shown, various reports may be provided including, but not limited to a patent map 2304, technology map 2302, a citation-tree 2306, any archived competitive activity 2308 (see, for example, FIG. 18), an indication 2314 as to whether the invention is currently being practiced by the assignee company (note: this could be retrieved from one of the business logic databases, etc.), a rating 2318 associated with the patent application/patent. Moreover, a search button 2310 may be provided for conducting an Internet search to determine whether the invention is being practiced by competitors. As an option, this may be accomplished using the query generator of FIGS. 9–10. Still yet, a recommendation 2312 may be provided, which may be calculated in the aforementioned manner. To carry out the decision 2108 of FIG. 21, a pair of buttons 2323 and 2324 are provided. Optionally, any portion of any of the reports may be e-mailed to other parties via an e-mail button 2320.

A plurality of different reports is disclosed in graphical user interface 2300. It should be noted, however, that different information may be reported based on and specific to the specific action item at issue. Following are examples of various combinations of different reports which may be issued as a function of the action item.

In one embodiment where the selected action item includes filing a first-filed patent application, the report may include at least one of 1) rating and 2) a patent map including pending patent applications and issued patents of at least two companies. In one specific embodiment, the present patent map may show the relative quantitative strength of patents (and possibly patent applications) of a variety of competitors (as possibly defined by the aforementioned business logic database) in a variety of technology groups (also possibly defined by the aforementioned business logic database). Of course, any desired recommendation (based on user defined logic or possibly not) may be listed to facilitate the decision.

In another embodiment where the selected action item includes filing an information disclosure statement for a patent application, the report may include a patent map associated with a technology group in which the patent application resides. In one specific embodiment, immediate access may be given to the patents of such patent map (i.e. via the aforementioned drill down technique, or the like); such that the patents requiring to disclose to the patent office in an information disclosure statement may be identified. Of course, any desired recommendation (based on user defined logic or possibly not) may be listed to facilitate the decision.

In other words, a patent report may be automatically be outputted in response to an information disclosure date deadline (i.e. 3 months from a filing date of a patent application, etc.). Such patent report may further include all of the patents in the same technology group as the subject patent application, based on a patent mapping. Still yet, the format of such report may take on a specific format (i.e. FORM 1449, etc.) that allows convenient submission to the United States Patent Office. Again, the report may be automatically sent (by email, etc.) to an attorney/agent responsible for the case associated with the particular intellectual property identifier. Such attorney/agent may be in-house or outside counsel. As yet a further option, electronic copies (i.e. PDF-versions, etc.) of the actual patents may also be sent. This feature thus ensures that the applicant adheres to his or her duty of disclosure under the knowledge of the patents collected during a patent mapping effort.

In still another embodiment where the selected action item includes foreign filing a patent application, the report may include at least one of 1) a patent map including foreign patents of at least two companies, and 2) a rating.

For example, a report may be generated to indicate a rating for a particular patent application. This rating may be based on a number of competing patents in the associated technology group. Still yet, such rating may be based on a number of international patents in a particular associated technology group. Even still, a number of associated licensing hits may factor into such rating. In any case, such rating may be automatically sent to the appropriate person some time before the one-year foreign filing deadline following the patent application filing date. Thus, the intelligence provided by the present system may be used to more intelligibly file foreign patent applications.

In cases where the application was filed under a consolidation treaty (i.e. patent cooperation treaty—PCT), the patent application may be similarly rated as to where it should be filed under a national phase, or whether there should be a national phase filing at all. In the present case, the rating may be factored based on a number of competing foreign patents in a particular technology group. For example, if a primary competitor has more than a threshold number of patents of a similar technology in a particular country, the aforementioned rating may be high. As an option, the threshold may be governed by a comparison of a number of company patents versus a number of competing patents.

In still yet another embodiment where the selected action item includes paying an issue fee for a patent application, filing a continuation patent application, or paying a maintenance fee; the report may include at least one of 1) a license map, 2) a citation map, 3) a rating, and 4) search results. Of course, any desired recommendation (based on user defined logic or possibly not) may be listed to facilitate the decision.

In still another example, a competing activity report or any other desired reports may automatically be outputted in response to a docketed patent issue date arriving. This may trigger a licensing effort or the like.

As is apparent from these specific examples, the competing activity report and/or other reports may be generated based on occurrences of a docketing system/file and further utilizing information stored therein. In one additional embodiment, the format, destination, use, etc. of the report may vary based on the status, any docketed dates, or any other docketing system/file information associated with the intellectual property identifier.

As an option, the reports may take the form of alerts based on a current status of the database (see, for example, FIG. 11), user-configured rules or thresholds, and even the docketing system. For example, a user may designate a Company x. If a number of patents of Company x ever exceeds a company's patents in any technology area, an alert (i.e. HTML, e-mail, SMS, etc.) may be issued to a user. Of course, any threshold or rule may be used (i.e. percentage based, formula-based, etc.). In one embodiment, the alert may identity the competing company, the technology area, and the rule or threshold that was triggered. These alerts may be used in various ways. Just by way of example, the foregoing alert may be prompt a user to file additional patent applications in the pertinent technology area.

In use, the foregoing versatile reporting framework may be employed to increase the value of a patent portfolio and further aid in the exploitation thereof. For example, competing activity and competing patent information may be used to determine in which areas invention disclosures should be taken, and further which invention disclosures should be filed as patent applications. Reports on the competing activity may also be used during the prosecutions of patent applications in order to ensure that claims not only define patentable subject matter, but also read on the competing activity. Still yet, the reports on the competing activity may be used to exploit issued patents in the form of licensing initiatives and the like. Further, the framework and reports may be used to assist a company in avoiding infringement of intellectual property rights and/or payment of licensing revenues by allowing them to gather, track, and examine potential adverse rights.

Additional information will now be set forth regarding the various ways the intelligence set forth hereinabove may be used to increase the value of a patent portfolio.

Strategically Selecting Disclosures to File for Patent Protection

Using the various mappings, a company can level the playing field with competitors by filling any gaps in a patent portfolio. When filtering invention disclosures to select those to file, for example, the technology mapping may be used to determine whether a patent on a particular disclosure would bolster patent protection in a technology area in which the company has few patents and patent applications. Moreover, this technique may be used to ensure market dominance in desired technology areas or identify opportunities for patent monopolies in unexplored technology groups. Further, by examining competing patent groupings, a company can determine whether it is falling behind in a particular area. Still yet, the present technique may be used to avoid patenting the same invention or minor variations thereof more than once.

Strategically Selecting Continuation Patent Applications

As mentioned earlier, the licensing map effectively identifies the crown jewel patents of a company. If such identification takes place before a patent has issued, this intelligence may warrant a continuation filing. By maintaining the pendency of such patent applications, maximum value may be extracted from the patent application by filing additional claims, broadening existing claims to ensure literal infringement, etc.

Increasing the Value of Already Pending Patent Applications

After conducting a licensing map, the resulting market intelligence may be used during patent prosecution to add claims that cover the newly identified activities. Thus, a patent application may be aligned with competitor activity, thus increasing the value of such patent application when it issues. In light of potential estoppel issues, it is preferred that claims only be added, as opposed to being amended.

Also, such market intelligence may be used when responding to an office action issued by a patent examiner. Traditionally, only the claims and prior art are the subject of attention when responding to an office action. By introducing a third element, market intelligence, claims can be amended in a manner which ensures that a more valuable likely-to-be-infringed patent issues as opposed to claims prosecuted in a vacuum.

Accelerating the Examination of Patent Applications

After conducting a licensing mapping, pending patent applications identified as being infringed may be eligible for accelerated examination by filing a petition to make special under 37 CFR 1.102 and 37 CFR1.496[3]. One caveat to such practice is that a patent practitioner should determine whether the evidence indicates that the competitor activity is prior art. If this is the case, an information disclosure statement should be filed rather than a petition to make special.

Conducting a Licensing Initiative

Using the market intelligence gathered during license mapping, licensing opportunities may be brought to light. Such intelligence may be used as a starting point in generating revenue through a licensing initiative.

Litigation Support

With the various mappings established and actively being used during patent procurement, a knowledge base is created that may be used to analyze and gather information about a portfolio for a variety of additional purposes. For example, the licensing mapping may be used to identify patents to be used defensively if confronted with one or more patents of a competitor in a litigation context. The patent mapping may also be used to "size up" a company from whom licensing revenue is being sought.

Figure 24:
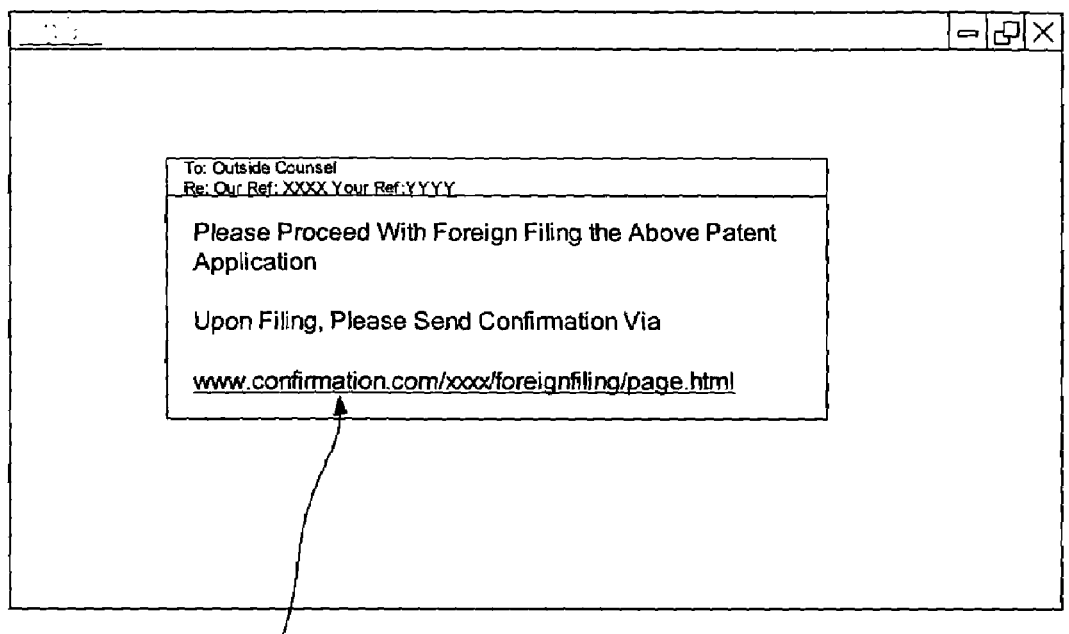
FIG. 24 illustrates a sample e-mail that may be used to report a decision as to an intellectual property action item for fulfillment, in accordance with one embodiment.

FIG. 24 illustrates a sample e-mail 2400 that may be used to report a decision as to an intellectual property action item for fulfillment, in accordance with one embodiment. As an option, such e-mail 2400 may be used in the context of operation 2110 of FIG. 21. As a further option, the e-mail 2400 may also represent the follow-up e-mail of operation 2114 of FIG. 21. Of course, however, such e-mail 2400 may be used in any desired context.

As shown, the e-mail 2400 may include a link for allowing the recipient of the e-mail 2400 to indicate whether the action item has been fulfilled. While a link is shown, it should be noted that a reply e-mail may be set with such indication or the link. Upon receipt of the replay e-mail or the link is used to indicate fulfillment of the action item, the system is capable of removing the associated action item off the list.

Figure 24A:
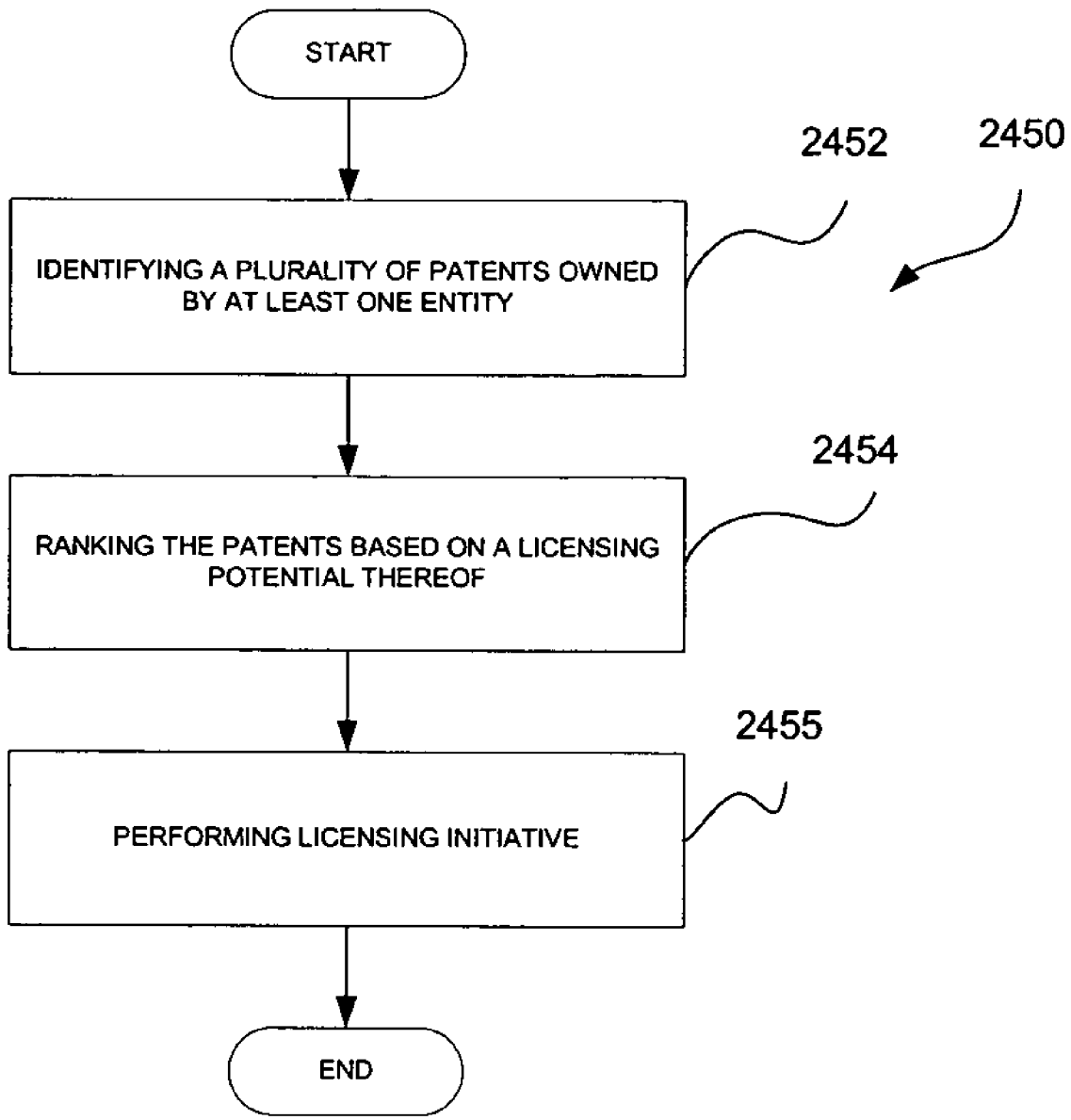
FIG. 24A illustrates a method for identifying licensable intellectual property, in accordance with one embodiment.

FIG. 24A illustrates a method 2450 for identifying licensable intellectual property, in accordance with one embodiment. As an option, the present technique disclosed herein may be integrated with the above techniques. In the alternative, the present technique may be implemented in any desired context.

Mentioned hereinabove are a plurality of techniques (i.e. licensing mapping, etc.) that may be used to identify licensable assets. Disclosed hereinbelow is another technique for identifying most-licensable assets which may or may not be used in combination with the techniques set forth hereinabove. Initially, a plurality of patents owned by at least one entity are identified. See operation 2452. Such entity may be a corporation or any other entity (i.e. person, etc.) capable of owning patents. Moreover, the patents may be identified utilizing either of the databases of FIG. 1, or using any other technique disclosed herein (or any other process for that matter).

Thereafter, in operation 2454, the patents are ranked based on a licensing potential thereof. Such ranking of the associated potential may be based on a number of words in the broadest claim. To this end, a number of words in the claims of the patents may be determined. Further, the patents may be identified based on the number of words in the claim. For example, dependent claims of each patent may be filtered out (i.e. by identifying dependency language—"as recited in claim x," etc.). Thereafter, the number of words in each independent claim may be counted, and the smallest number may be stored. Thus, the patents with the smallest number of words may be ranked prior to those patents with broadest claims having more words (i.e. limitations, etc.)

Further, a search string derived using the technique of FIGS. 9 and 10 and a number of search "hits" and the relevancy thereof may be used to further rank the licensability of the assets. Still yet, various other information such as notes, files, etc. stored in association with the assets may be considered in such ranking. Even still, a total number of claims, a number of "forward references," etc. may be utilized. Moreover, forward references that were cited by the Examiner (i.e. these are earmarked with an "*" on the patent and in related database, etc.) may be given even more weight, moving such patents up in the ranking.

It should be noted the foregoing techniques may be used by themselves and/or in combination based on any desired weighting, user-configuration, etc.

To this end, in a large portfolio of patents, the most licensable patents may be reviewed prior to the rest. In a portfolio of over 100 patents, this can result in a large time/cost-savings. See operation 2455.

As an option, to facilitate review, a claim worksheet may be extracted, displayed, printed, etc. To accomplish this, a list of the broadest independent claims (identified in the aforementioned manner or any other manner for that matter) may be extracted and optionally formatted. As a further option, each broadest claim may be identified with a docket number, patent/application identifier, title, priority date, etc. As a further option, a broadest method AND apparatus claim may be extracted for each patent, based on user configuration.

It should be noted that the foregoing techniques and/or similar derivatives may further be utilized in a situation where "defensive trading chips" are to be identified. Specifically, a method and associated computer program product are provided for identifying valuable intellectual property in situations when a company is fending off a patent infringement suit of another company.

To accomplish this, a first entity and a second entity are identified which each own a plurality of patents. Such entities may be corporate entities or any other entity that is capable of owning a plurality of patents. For example, if an in-house counsel is working for Company X, which recently had been sued for patent infringement by Company Y, such in-house counsel would enter both Company X and Company Y.

Next, the patents for Company Y and Company X are identified (including those identified after-issuance) to determine whether any of the Company Y patents list as "backward references" (i.e. those references cited during the prosecution thereof, etc.) any Company X patents. Of course, any desired technique may be used to identify such Company X patents that meet such criteria. For example, in a database that lists assignees of backward references, such field of each of the Company Y patents merely needs to be searched for the string: "Company X."

Still yet, Company X patents that were cited by the Examiner (i.e. these are earmarked with an "*" on the patent and in related database, etc.) during the prosecution of the Company Y patents may be ear-marked or otherwise identified, since they are often more relevant and more thus more likely infringed by Company X.

To this end, defensive trading chips may be quickly ascertained. It should be noted that the various techniques in the previous licensing processes may be used in the present context by using such technology to focus on a particular company (namely the company that sued "Company X" in the above exemplary scenario).

Figure 25:
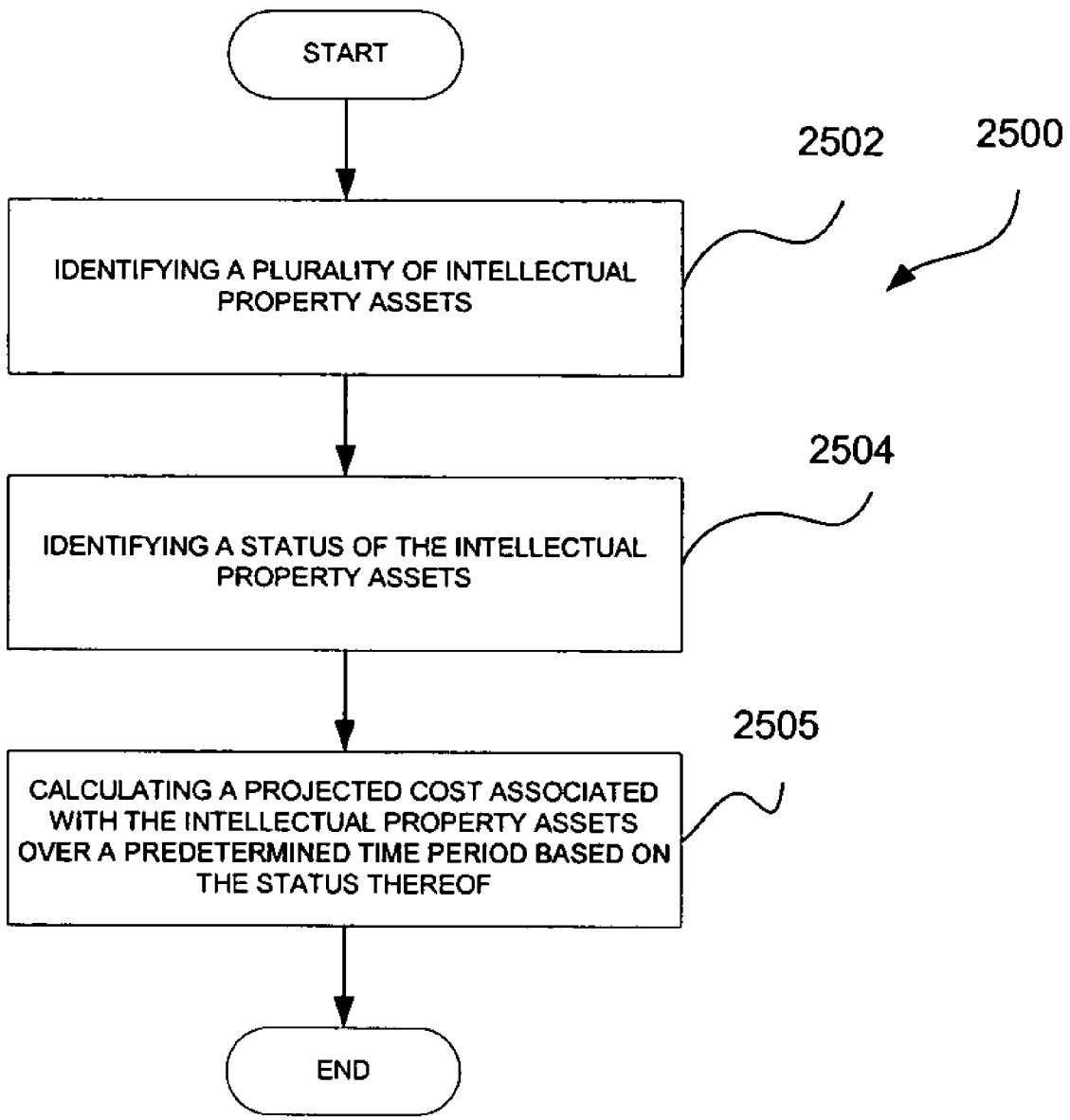
FIG. 25 illustrates a method for intellectual property budget management, in accordance with one embodiment.

FIG. 25 illustrates a method 2500 for intellectual property budget management, in accordance with one embodiment.

As an option, the intellectual property budget management technique disclosed herein may be integrated with the above techniques. In the alternative, the present technique may be implemented in any desired context.

Initially, a plurality of intellectual property assets is identified. See operation 2502. In one embodiment, such identification may be accomplished manually, automatically and/or in the manner set forth hereinabove.

Next, in operation 2504, a status of the intellectual property assets is identified. Similar to the previous operation, the status may be identified manually, automatically and/or in the manner set forth hereinabove. Moreover, the status may include a disclosure state, a pending state, a patented state, and an abandoned state. Of course, the status may be of any desired specificity relating to the intellectual property lifecycle.

In operation 2505, a projected cost associated with the intellectual property assets is then calculated over a predetermined time period based on the status thereof. In one embodiment, the projected cost may include prosecution costs and maintenance fees, government fees, prosecution firm fees, etc. Moreover, the predetermined time period may be a year time period, quarter time period, or tailored in any other desired manner to accommodate a particular corporate situation. The time period may be further user defined.

It should be noted that the projected cost may be accomplished in any desired manner that is dependent on the status of the intellectual property assets. Following is one specific example that may optionally be employed. Such example should not be construed as being limiting in any manner.

As an option, each status may have an associated action item cost associated therewith. Such action item cost may be determined for each action item that takes place in the intellectual property lifecycle. For example, the action item cost of a patent may include $A in gov't fees and $B in prosecution firm fees for payment of a maintenance fee at certain time periods after issuance, $C in gov't fees and $D in prosecution firm fees for preparation and filing of an amendment, etc. after a certain time period after filing.

Of course, these action item costs may be estimates. Moreover, they may be estimated based on national averages and current government fee schedules. Still yet, each prosecution firm service provider of a company may fill out an on-line table illustrating prices or a range of prices for each action item. By associating each intellectual property asset with the prosecution firm handling the same, such prosecution firm's table may, in turn, be associated with the appropriate intellectual property asset. Such estimates (i.e. tables, etc.) may be updated via a network by way of a web-site or any other desired technique.

To this end, each action item cost that arises during the predetermined time period (based on the status of the intellectual property assets) is added to calculate the projected cost. For example, if it is determined that a patent application becomes 2 years old within the predetermined time period and has not received an office action, it can be estimated that one will be received and the cost of preparing a response to office action will be incurred within the next year.

As an option, an estimated intellectual property budget may further be received. A number of additional intellectual property assets capable of being filed may then be determined based on the projected cost and the intellectual property budget. Of course, the additional intellectual property assets to be filed may be received, and the intellectual property budget calculated instead.

Still yet, the intellectual property budget, an aspect of the projected cost, and/or the number of additional intellectual property assets capable of being filed may be altered by the user. Thus, a remaining one of the intellectual property budget, the aspect of the projected cost, and/or the number of additional intellectual property assets capable of being filed may be calculated based on the alteration. Thus, a user is provided with the opportunity to vary various parameters of the budget, and produce desired results.

Even still, a score may be associated with the intellectual property assets. Such score may be determined manually, automatically, or using any other desired technique (such as the mapping, patent analytics, etc. mentioned hereinabove.). Moreover, a cut-off score may be user-configured indicating that an action item cost associated intellectual property assets falling below the score threshold will not be expended. The projected cost may then be updated based on the determination. Thus, using this scoring method, certain less-important intellectual property assets may be sacrificed, in favor of expending resources on other more-important intellectual property assets, while staying within the intellectual property budget.

For reporting purposes, the projected cost may be calculated at multiple instances in time, with each instance being stored. Thus, each instance may be compared to determine the accuracy of the projected cost. This information may then be "fed back" to update the manner in which the projected cost is calculated. For example, a company may be active in a certain technical art that is handled by a USPTO group art unit that provides office actions in 1 year (exceptionally good service). This may be reflected in the aforementioned feedback calculations, and the present scheme may be automatically updated.

Moreover, the present invention may interface an invoice tracking system for determining the accuracy of the tables of action item costs. This may even be done on a prosecution firm-by-firm basis, showing the discrepancy of the projected cost and actual cost. This may be helpful in reviewing the value-vs.-price a prosecution firm is providing.

While various embodiments have been described above, it should be understood that they have been presented by way of example only, and not limitation. For example, any of the network components may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A graphical user interface for use in association with a network browser, comprising:
    a network browser window associated with a network browser for displaying Internet content associated with uniform resource locators (URLs) during network browsing;
    a plurality of identifiers adjacent to the window in which the content is displayed;
    wherein a user is allowed to pre-select one of the identifiers which is non-inclusive of any portion of the URLs;
    wherein, after the pre-selection, selected content associated with at least one of the URLs displayed during use of the network browser is correlated with the pre-selected identifier in a manner that is dependent on a selection of the pre-selected identifier which is non-inclusive of any portion of the URLs, and stored;
    wherein the user is allowed to manually enter the pre-selected identifier which is non-inclusive of any portion of the URLs.

2. A graphical user interface as recited in claim 1, wherein the identifiers are selected for identifying further information associated therewith.

3. A graphical user interface as recited in claim 1, wherein the URLs are displayed by browsing.

4. A graphical user interface as recited in claim 1, and further comprising allowing the user to subsequently access the content utilizing the identifier.

5. A graphical user interface as recited in claim 1, wherein the content is correlated upon selection of the content.

6. A graphical user interface as recited in claim 5, wherein the content is automatically correlated upon selection of the content.

7. A graphical user interface as recited in claim 1, wherein the identifiers have associated displayed buckets.

8. A graphical user interface as recited in claim 7, wherein the identifiers identify the buckets.

9. A graphical user interface as recited in claim 8, wherein the identifiers include intellectual property identifiers.

10. A graphical user interface as recited in claim 9, wherein a search is performed in association with at least one of a plurality of patents using at least one synonym, by:
    identifying at least one claim associated with one of the patents,
    extracting a plurality of terms from the claim,
    identifying at least one synonym associated with at least one of the terms, and
    conducting a search utilizing the terms and the at least one synonym.

11. The graphical user interface of claim 10, wherein the terms of the claim are retrieved from a database.

12. The graphical user interface of claim 10, wherein the terms of the claim are automatically retrieved from a database.

13. The graphical user interface of claim 10, wherein noun terms of the claim are identified.

14. The graphical user interface of claim 10, wherein verb terms of the claim are identified.

15. The graphical user interface of claim 10, wherein Boolean searching is incorporated with the searching based on the terms of the claim of the patent and the at least synonym.

16. The graphical user interface of claim 10, wherein AND operators are incorporated with the terms of the claim of the patent and the at least synonym.

17. The graphical user interface of claim 10, wherein a plurality of the synonyms are identified based on the terms of the claim of the patent, utilizing a synonym database.

18. The graphical user interface of claim 17, wherein the synonyms are incorporated with the terms of the claim of the patent to increase the breadth of the search.

19. The graphical user interface of claim 18, wherein the synonyms are incorporated with the terms of the claim of the patent utilizing an OR operator.

20. The graphical user interface of claim 10, wherein the word "claim" is removed from the terms of the claim of the patent.

21. The graphical user interface of claim 10, wherein the search is conducted manually upon receiving a user request.

22. The graphical user interface of claim 10, wherein the search is conducted automatically at predetermined intervals.

23. The graphical user interface of claim 10, wherein the terms are modified based on results of the search.

24. The graphical user interface of claim 23, wherein the terms are modified based on results of the search and user input.

25. The graphical user interface of claim 23, wherein the terms are modified based on results of the search automatically.

26. A graphical user interface as recited in claim 7, wherein the buckets are accessed via menus.

27. A graphical user interface as recited in claim 26, wherein the buckets are accessed via sub-menus.

28. A graphical user interface as recited in claim 26, wherein the buckets are selected by being clicked.

29. A graphical user interface as recited in claim 1, wherein the content includes an entire web page.

30. A graphical user interface as recited in claim 1, wherein the content includes documentation in a portable document format.

31. A graphical user interface as recited in claim 1, wherein the date is stored with the content.

32. A graphical user interface as recited in claim 31, wherein the date includes a date at which time the content was discovered.

33. A graphical user interface as recited in claim 1, wherein the URL is stored with the content.

34. A graphical user interface as recited in claim 1, wherein any content selected during use of the network browser results in automatic correlation with the pre-selected identifier.

35. A graphical user interface as recited in claim 1, wherein the content involves competing activity.

36. A computer program product embodied on a computer readable medium for displaying a network browser graphical user interface for storing content in association with a network browser, comprising:
  computer code for working in conjunction with a network browser window associated with a network browser for displaying Internet content associated with uniform resource locators (URLs) during network browsing; and
  computer code for displaying a plurality of identifiers in a window separate from the window in which the content is displayed;
  wherein a user is allowed to pre-select one of the identifiers which is separate from the URLs;
  wherein, after the pre-selection, selected content associated with at least one of the URLs displayed during use of the network browser is correlated with the pre-selected identifier in a manner that is dependent on a selection of the pre-selected identifier which is separate from the URLs, and stored;
  wherein the identifiers are capable of being manually entered by the user;
  wherein any content selected during use of the network browser results in automatic correlation of the content with the manually entered, pre-selected identifier which is separate from the URLs.

37. A computer program product embodied on a computer readable medium for displaying a network browser graphical user interface, comprising:
  computer code for working in conjunction with a network browser window associated with a network browser for displaying Internet content associated with uniform resource locators (URLs) during network browsing; and
  computer code for displaying a plurality of identifiers in a portion of the network browser graphical user interface to the side of the window in which the content is displayed;
  wherein a user is allowed to pre-select at least one of the identifiers in the portion of the network browser graphical user interface to the side of the window in which the Internet content associated with the URLs is displayed, in association with the network browser;
  wherein, after the pre-selection, selected content associated with at least one of the URLs displayed during use of the network browser is correlated with the pre-selected identifier in a manner that is based on the pre-selected identifier which is distinct with respect to the URLs, and stored;
  wherein the pre-selected identifier is distinct with respect to the URLs and is capable of being manually modified by the user utilizing a user-selectable object adapted for modifying.

38. A system including a computer readable medium, comprising:
  means for working in conjunction with a network browser window associated with a network browser for displaying Internet content associated with uniform resource locators (URLs) during network browsing; and
  means for displaying a plurality of identifiers adjacent to the window in which the content is displayed;
  wherein a user is allowed to pre-select at least one of the identifiers which is different from the URLs;
  wherein, after the pre-selection, selected content associated with at least one of the URLs displayed during use of the network browser is correlated with the pre-selected identifier in a manner that is based on the pre-selected identifier which is different from the URLs, and stored;
  wherein, after the pre-selection, any content selected during use of the network browser results in automatic correlation of the content with the pre-selected identifier which is different from the URLs;
  wherein the pre-selected identifier is different from the URLs and is capable of being manually entered by the user.

39. A system, comprising:
  a computer;
  a network browser installed on the computer;
  computer code for working in conjunction with a network browser window associated with the network browser for displaying Internet content associated with uniform resource locators (URLs) during network browsing; and
  computer code for displaying a plurality of identifiers adjacent to the window in which the content is displayed;
  wherein a user is allowed to pre-select at least one of the identifiers which is non-inclusive of any portion of the URLs;
  wherein, after the pre-selection, selected content associated with at least one of the URLs displayed during use of the network browser is correlated with the pre-selected identifier based on the selection of the pre-selected identifier which is non-inclusive of any portion of the URLs, and stored;
  wherein, after the pre-selection, any content selected during use of the network browser results in automatic correlation of the content with the pre-selected identifier in a manner that is based on the pre-selected identifier which is non-inclusive of any portion of the URLs;

wherein the pre-selected identifier is capable of being manually entered by the user manually adding to the plurality of identifiers utilizing an icon adapted for adding to the plurality of identifiers which are non-inclusive of any portion of the URLs.

40. A computer program product embodied on a computer readable medium for displaying a network browser graphical user interface for archiving content in association with a network browser, comprising:

computer code for working in conjunction with a network browser window associated with a network browser for displaying content associated with uniform resource locators (URLs) during network browsing; and computer code for displaying a plurality of buckets adjacent to and separate from the window in which the content is displayed;

wherein a user is allowed to pre-select an identifier associated with one of a plurality of buckets;

wherein, after the pre-selection and upon selection, selected content associated with multiple URL's displayed during use of the network browser is correlated with the pre-selected identifier in a manner that is based on a selection of the pre-selected identifier which is different from the URLs and is capable of being manually added by the user, for being stored in user computer memory;

wherein the user is allowed to subsequently access the content utilizing the identifier;

wherein a date is stored with the content;

wherein any content selected during use of the network browser results in automatic correlation with the pre-selected identifier which is different from the URLs and is capable of being manually added by the user;

wherein the identifiers are different from the URLs and are capable of being manually added by the user.

* * * * *

(12) INTER PARTES REEXAMINATION CERTIFICATE (0173rd)
United States Patent
Zilka et al.

(10) Number: US 7,117,443 C1
(45) Certificate Issued: Jul. 13, 2010

(54) NETWORK BROWSER GRAPHICAL USER INTERFACE FOR MANAGING WEB CONTENT

(75) Inventors: Kevin J. Zilka, San Jose, CA (US); Dominic M. Kotab, San Jose, CA (US)

(73) Assignee: Aloft Media, LLC, Longview, TX (US)

Reexamination Request:
No. 95/000,462, Mar. 26, 2009

Reexamination Certificate for:
| | |
|---|---|
| Patent No.: | 7,117,443 |
| Issued: | Oct. 3, 2006 |
| Appl. No.: | 10/691,057 |
| Filed: | Oct. 22, 2003 |

Related U.S. Application Data

(63) Continuation of application No. 10/671,045, filed on Sep. 24, 2003, which is a continuation-in-part of application No. 10/324,887, filed on Dec. 18, 2002, which is a continuation-in-part of application No. 10/254,410, filed on Sep. 24, 2002, now abandoned.

(60) Provisional application No. 60/324,941, filed on Sep. 24, 2001.

(51) Int. Cl.
*G06F 17/00* (2006.01)

(52) U.S. Cl. ..................................................... 715/739
(58) Field of Classification Search ........................ None
See application file for complete search history.

(56) References Cited

U.S. PATENT DOCUMENTS

| | | | |
|---|---|---|---|
| 5,917,491 A | 6/1999 | Bauersfeld | |
| 6,037,934 A | 3/2000 | Himmel et al. | |
| 6,041,360 A | 3/2000 | Himmel et al. | |
| 6,314,423 B1 | 11/2001 | Himmel et al. | |
| 6,493,702 B1 | 12/2002 | Adar et al. | |
| 6,546,393 B1 | 4/2003 | Khan | |
| 6,973,456 B1 | 12/2005 | Elgart | |

FOREIGN PATENT DOCUMENTS

EP 1030247 A2 8/2000

OTHER PUBLICATIONS

Archived Webpages from Blink.com, 74 pages.
Archived Webpages from Clickmarks.com, 58 pages.
Archived Webpages from SpotOn.com, 74 pages.
Chakrabarti, S. et al. (2000). "Using Memex to Archive and Mine Community Web Browsing Experience," Computer Networks 33:669–684.
Pfaffenberger, B. (1995). *Netscape Navigator 3.0, Surfing the Web and Exploring the Internet,* AP Professional: Chestnut Hill, MA, pp. xv–xvi, 3, 5–12, 22, 76–84, 91–107, 201–209, 443.
Surfsaver.com Archived Webpages, 66 pages.
Underdahl, B. (2000). *Opera Web Browser for Dummies,* IDB Books Worldwide, Inc.: Foster City, CA, pp. 9–16, 28–32, 36–37, 40–42, 46–53, 67–93, 97, 152–153, 185–189.

*Primary Examiner*—Andrew L Nalven

(57) ABSTRACT

A network browser graphical user interface is provided for use in association with a network browser. Included is a network browser window associated with a network browser for displaying content associated with uniform resource locators (URLs) during network browsing. Also displayed is a plurality of identifiers adjacent to or separate from the window in which the content is displayed. In use, a user is allowed to pre-select at least one of the identifiers. Moreover, after the pre-selection, content associated with at least one URL displayed during use of the network browser is correlated with the pre-selected identifier.

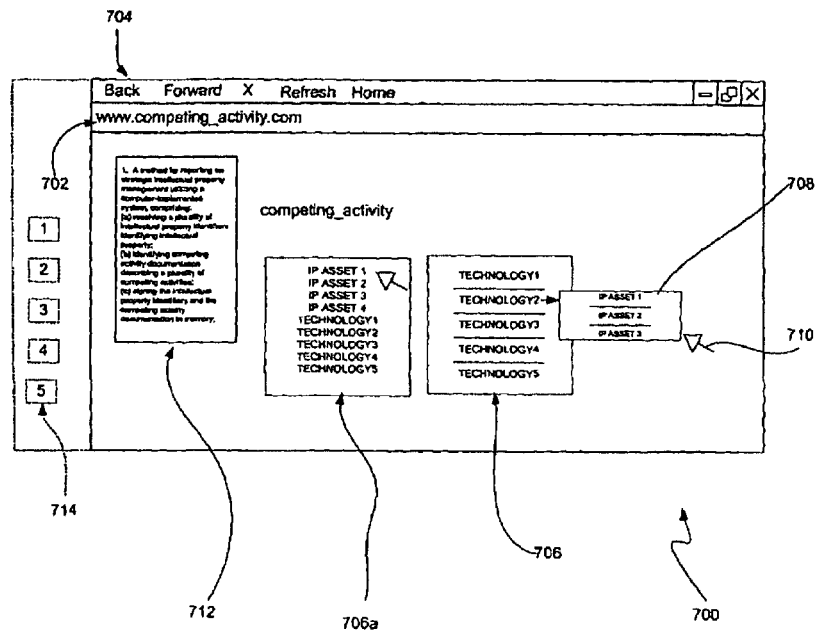

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-9 and 26-40 are cancelled.
Claims 10-25 were not reexamined.

\* \* \* \* \*